US011212833B2

(12) United States Patent
Lei et al.

(10) Patent No.: US 11,212,833 B2
(45) Date of Patent: Dec. 28, 2021

(54) SCALABLE PREAMBLE DESIGN FOR RANDOM ACCESS

(71) Applicant: QUALCOMM Incorporated, San Diego, CA (US)

(72) Inventors: Jing Lei, San Diego, CA (US); Seyong Park, San Diego, CA (US); Jay Kumar Sundararajan, San Diego, CA (US); Linhai He, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/592,608

(22) Filed: Oct. 3, 2019

(65) Prior Publication Data
US 2020/0146055 A1 May 7, 2020

Related U.S. Application Data

(60) Provisional application No. 62/755,404, filed on Nov. 2, 2018.

(51) Int. Cl.
*H04W 74/00* (2009.01)
*H04W 74/08* (2009.01)

(52) U.S. Cl.
CPC ..... *H04W 74/008* (2013.01); *H04W 74/0833* (2013.01)

(58) Field of Classification Search
CPC ............ H04W 74/008; H04W 74/0833; H04L 25/0224; H04L 27/2602; H04L 27/2613;
(Continued)

(56) References Cited

U.S. PATENT DOCUMENTS

2013/0013982 A1* 1/2013 Hwang ............... H04L 1/004
714/776
2015/0222551 A1* 8/2015 Lida .................... H04L 25/4908
370/236
(Continued)

FOREIGN PATENT DOCUMENTS

EP 2159926 A1 * 3/2010 ......... H04B 1/71072
WO WO-2018064367 A1 * 4/2018 ......... H04W 74/004
(Continued)

OTHER PUBLICATIONS

International Search Report and Written Opinion—PCT/US2019/054704—ISA/EPO—dated Feb. 3, 2020.

*Primary Examiner* — Shailendra Kumar
(74) *Attorney, Agent, or Firm* — Holland & Hart LLP

(57) ABSTRACT

Methods, systems, and devices for wireless communications are described. An example of a method in accordance with the present disclosure may include a UE identifying that the UE is configured to use a contention-based or uncoordinated (e.g., two-step) random access procedure including an uplink message and a downlink response, where the uplink message includes at least a preamble portion and a data portion. The UE may map an identifier of the UE into a block of source symbols, generate a codeword including a block of coded symbols from the block of source symbols, and generate a set of sequences, where each sequence is based at least in part on a value associated with a corresponding coded symbol of the block of coded symbols. The UE may transmit the generated set of sequences in a preamble portion of the uplink message.

30 Claims, 19 Drawing Sheets

(58) Field of Classification Search
CPC ....... H04L 5/0062; H04L 5/14; H04L 5/0033; H04L 5/0048; H04L 5/001; H04L 5/0026; H04L 5/0091; H04J 11/0023; H04J 13/0062

See application file for complete search history.

(56) References Cited

U.S. PATENT DOCUMENTS

| | | | |
|---|---|---|---|
| 2018/0097591 A1* | 4/2018 | Islam | H04W 72/005 |
| 2019/0075598 A1* | 3/2019 | Li | H04W 76/11 |
| 2019/0274168 A1* | 9/2019 | Hwang | H04W 74/004 |
| 2019/0320467 A1* | 10/2019 | Freda | H04W 74/0833 |

FOREIGN PATENT DOCUMENTS

| | | | | |
|---|---|---|---|---|
| WO | WO-2018127042 A1 * | 7/2018 | | H04W 72/14 |
| WO | WO-2018175809 A1 * | 9/2018 | | H04W 74/0833 |

* cited by examiner

SCALABLE PREAMBLE DESIGN FOR RANDOM ACCESS

CROSS REFERENCE

The present Application for patent claims the benefit of U.S. Provisional Patent Application No. 62/755,404 by LEI et al., entitled "SCALABLE PREAMBLE DESIGN FOR RANDOM ACCESS," filed Nov. 2, 2018, assigned to the assignee hereof, and expressly incorporated herein.

BACKGROUND

The following relates generally to wireless communications and to scalable preamble design for random access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless systems may support random access procedures for establishing communications between a UE and a base station. The random access procedure may involve several handshake messages between the UE and the base station. In some cases, it may be desirable to reduce latency, improve spectral efficiency, or reduce conflicts between UEs that may be associated with performing random access procedures.

SUMMARY

The described techniques relate to improved methods, systems, devices, and apparatuses that support scalable preamble design for random access. Generally, the described techniques provide for generating random access preambles that may be transmitted by a user equipment (UE), which may include a mapping of signal sequences associated with a UE identifier to groups of resource elements, where such a mapping may include patterns that may be detectable by a base station. The random access preamble, or some portion or characteristic thereof, may be used to decode accompanying information about the transmitting UE, which may be used by the base station to establish communications with the UE or otherwise provide the UE with communication resources or configuration information to access a network (e.g., in response to a random access request from the UE).

In some wireless communication systems, a base station may serve multiple UEs capable of performing a random access procedure, such as a two-step random access procedure. In some examples, a base station of the wireless communication system may support non-orthogonal multiple access (NOMA) techniques, where communications with different UEs may occur using non-orthogonal communication resources (e.g., overlapping portions of a radio frequency spectrum band during overlapping time intervals). In accordance with examples of the present disclosure, a wireless communication system may employ various techniques to reduce collisions of UEs that may be performing random access procedures (e.g., contention-based or uncoordinated random access procedures), such as random access transmissions using non-orthogonal communication resources. For example, a UE may transmit information identifying the UE in a random access preamble (e.g., the preamble used in the random access procedure), which may be coded and mapped to resource element groups according to various sequences. A set of sequences may be based at least in part on a selection or determination by the UE, which may include a selection or determination from a set of options indicated by a base station (e.g., a cell-specific preamble configuration signaled by the base station). Such coding and mapping may be configured to generate an uplink message, including a preamble, that reduces collisions between UEs that may be attempting to access a wireless system, or to improve the ability for a base station to detect random access requests from UEs that may be attempting to access with a wireless system over non-orthogonal communication resources, or both.

A method of wireless communication at a UE is described. The method may include identifying that the UE is configured to use a contention-based or uncoordinated random access procedure (e.g., a two-step random access channel (RACH) procedure), the contention-based or uncoordinated random access procedure including an uplink message and a downlink response, and the uplink message including at least a preamble portion and a data portion, mapping an identifier of the UE into a block of source symbols, generating the block of source symbols based on the identifier of the UE, or a resource index of the contention-based or uncoordinated random access procedure, or a combination thereof, generating a codeword from the block of source symbols, the codeword including a block of coded symbols, generating a set of sequences, each sequence of the set of sequences based on a value associated with a corresponding coded symbol of the block of coded symbols, and transmitting, as part of the contention-based or uncoordinated random access procedure, the generated set of sequences in the preamble portion of the uplink message.

An apparatus for wireless communication at a UE is described. The apparatus may include a processor, memory in electronic communication with the processor, and instructions stored in the memory. The instructions may be executable by the processor to cause the apparatus to identify that the UE is configured to use a contention-based or uncoordinated random access procedure (e.g., a two-step RACH procedure), the contention-based or uncoordinated random access procedure including an uplink message and a downlink response, and the uplink message including at least a preamble portion and a data portion, map an identifier of the UE into a block of source symbols, generate the block of source symbols based on the identifier of the UE, or a resource index of the contention-based or uncoordinated random access procedure, or a combination thereof, generate a codeword from the block of source symbols, the codeword including a block of coded symbols, generate a set of sequences, each sequence of the set of sequences based on a value associated with a corresponding coded symbol of the block of coded symbols. The apparatus may further include a transmitter configured to transmit, as part of the contention-based or uncoordinated random access procedure, the generated set of sequences in the preamble portion of the uplink message.

Another apparatus for wireless communication at a UE is described. The apparatus may include means for identifying that the UE is configured to use a contention-based or uncoordinated random access procedure (e.g., a two-step RACH procedure), the contention-based or uncoordinated random access procedure including an uplink message and a downlink response, and the uplink message including at least a preamble portion and a data portion, mapping an identifier of the UE into a block of source symbols, generating the block of source symbols based on the identifier of the UE, or a resource index of the contention-based or uncoordinated random access procedure, or a combination thereof, generating a codeword from the block of source symbols, the codeword including a block of coded symbols, generating a set of sequences, each sequence of the set of sequences based on a value associated with a corresponding coded symbol of the block of coded symbols, and transmitting, as part of the contention-based or uncoordinated random access procedure, the generated set of sequences in the preamble portion of the uplink message.

A non-transitory computer-readable medium storing code for wireless communication at a UE is described. The code may include instructions executable by a processor to identify that the UE is configured to use a contention-based or uncoordinated random access procedure (e.g., a two-step RACH procedure), the contention-based or uncoordinated random access procedure including an uplink message and a downlink response, and the uplink message including at least a preamble portion and a data portion, map an identifier of the UE into a block of source symbols, generate the block of source symbols based on the identifier of the UE, or a resource index of the contention-based or uncoordinated random access procedure, or a combination thereof, generate a codeword from the block of source symbols, the codeword including a block of coded symbols, generate a set of sequences, each sequence of the set of sequences based on a value associated with a corresponding coded symbol of the block of coded symbols, and transmit, as part of the contention-based or uncoordinated random access procedure, the generated set of sequences in the preamble portion of the uplink message.

Some examples of the method, apparatuses, and non-transitory computer-readable medium described herein may further include operations, features, means, or instructions for receiving, from a base station, a configuration providing at least one parameter value used to generate a preamble, where the preamble may be based on the at least one parameter value.

Some examples of the method, apparatuses, and non-transitory computer-readable medium described herein may further include operations, features, means, or instructions for mapping the generated set of sequences to a set of resource element groups of the preamble portion prior to transmitting the generated set of sequences.

In some examples of the method, apparatuses, and non-transitory computer-readable medium described herein, mapping the generated set of sequences to the set of resource element groups may include operations, features, means, or instructions for mapping, for each sequence of the generated set of sequences, the sequence to one of the set of resource element groups.

In some examples of the method, apparatuses, and non-transitory computer-readable medium described herein, mapping the generated set of sequences to the set of resource element groups may include operations, features, means, or instructions for identifying an index associated with a sequence of the generated set of sequences, and mapping the sequence to one of the set of resource element groups based on the identified index.

Some examples of the method, apparatuses, and non-transitory computer-readable medium described herein may further include operations, features, means, or instructions for mapping the sequence to the one of the set of resource element groups may be further based on an identifier of a cell of the base station and the index of the resource element group.

In some examples of the method, apparatuses, and non-transitory computer-readable medium described herein, the set of resource element groups span six physical resource blocks in a frequency domain and four OFDM symbol periods in a time domain.

In some examples of the method, apparatuses, and non-transitory computer-readable medium described herein, the set of resource element groups span six physical resource blocks in a frequency domain and five OFDM symbol periods in a time domain.

In some examples of the method, apparatuses, and non-transitory computer-readable medium described herein, generating the set of sequences may include operations, features, means, or instructions for identifying an index indicated by the coded symbol, identifying at least one parameter value associated with the identified index, and generating a sequence based on the at least one parameter value.

In some examples of the method, apparatuses, and non-transitory computer-readable medium described herein, the at least one parameter value includes one or more of a comb index, or a root value, or a cyclic shift.

In some examples of the method, apparatuses, and non-transitory computer-readable medium described herein, the sequence includes a finite-size orthogonal sequence.

In some examples of the method, apparatuses, and non-transitory computer-readable medium described herein, the block of source symbols include symbols of a non-binary alphabet.

In some examples of the method, apparatuses, and non-transitory computer-readable medium described herein, a block size of the generated codeword may be greater than a block size of the block of source symbols.

In some examples of the method, apparatuses, and non-transitory computer-readable medium described herein, each source symbol of the block of source symbols may be selected from a set of symbols, and a set size of the set of symbols, or a block size of the block of source symbols, or both, may be based on a target collision probability.

Some examples of the method, apparatuses, and non-transitory computer-readable medium described herein may further include operations, features, means, or instructions for generating the data portion based on the identifier of the UE.

In some examples of the method, apparatuses, and non-transitory computer-readable medium described herein, a numerology of the preamble portion may be different from a numerology of the data portion.

Some examples of the method, apparatuses, and non-transitory computer-readable medium described herein may further include operations, features, means, or instructions for transmitting the data portion of the uplink message on a physical uplink shared channel (PUSCH).

A method of wireless communication at a base station is described. The method may include receiving, as part of a contention-based or uncoordinated random access procedure (e.g., a two-step RACH procedure), an uplink message from a UE, the uplink message including at least a preamble portion and a data portion, identifying a set of sequences in the preamble portion, generating a block of coded symbols from the identified set of sequences, each coded symbol of the block of coded symbols corresponding to a sequence of the set of sequences, the block of coded symbols including a codeword, decoding the codeword to generate a block of source symbols, and determining an identifier of the UE from the generated block of source symbols.

An apparatus for wireless communication at a base station is described. The apparatus may include a processor, memory in electronic communication with the processor, and instructions stored in the memory. The apparatus may include a receiver configured to receive, as part of a contention-based or uncoordinated random access procedure (e.g., a two-step RACH procedure), an uplink message from a UE, the uplink message including at least a preamble portion and a data portion. The instructions may be executable by the processor to cause the apparatus to identify a set of sequences in the preamble portion, generate a block of coded symbols from the identified set of sequences, each coded symbol of the block of coded symbols corresponding to a sequence of the set of sequences, the block of coded symbols including a codeword, decode the codeword to generate a block of source symbols, and determine an identifier of the UE from the generated block of source symbols.

Another apparatus for wireless communication at a base station is described. The apparatus may include means for receiving, as part of a contention-based or uncoordinated random access procedure (e.g., a two-step RACH procedure), an uplink message from a UE, the uplink message including at least a preamble portion and a data portion, identifying a set of sequences in the preamble portion, generating a block of coded symbols from the identified set of sequences, each coded symbol of the block of coded symbols corresponding to a sequence of the set of sequences, the block of coded symbols including a codeword, decoding the codeword to generate a block of source symbols, and determining an identifier of the UE from the generated block of source symbols.

A non-transitory computer-readable medium storing code for wireless communication at a base station is described. The code may include instructions executable by a processor to receive, as part of a contention-based or uncoordinated random access procedure (e.g., a two-step RACH procedure), an uplink message from a UE, the uplink message including at least a preamble portion and a data portion, identify a set of sequences in the preamble portion, generate a block of coded symbols from the identified set of sequences, each coded symbol of the block of coded symbols corresponding to a sequence of the set of sequences, the block of coded symbols including a codeword, decode the codeword to generate a block of source symbols, and determine an identifier of the UE from the generated block of source symbols.

Some examples of the method, apparatuses, and non-transitory computer-readable medium described herein may further include operations, features, means, or instructions for determining a channel estimation based on the preamble portion, and decoding the data portion based on the identifier of the UE and the determined channel estimation.

Some examples of the method, apparatuses, and non-transitory computer-readable medium described herein may further include operations, features, means, or instructions for transmitting, in response to the uplink message and according to the determined identifier of the UE, a downlink response as part of the contention-based or uncoordinated random access procedure.

Some examples of the method, apparatuses, and non-transitory computer-readable medium described herein may further include operations, features, means, or instructions for identifying at least one parameter value to be used to generate a preamble of the uplink message, and transmitting a configuration providing the at least one parameter value, where the received uplink message may be based on the transmitted configuration.

In some examples of the method, apparatuses, and non-transitory computer-readable medium described herein, identifying the set of sequences in the preamble portion may include operations, features, means, or instructions for identifying a resource element group configuration for the preamble portion, the resource element group configuration indicating a time and frequency position for each resource element group of the set of resource element groups, and identifying the set of sequences from the set of resource element groups.

In some examples of the method, apparatuses, and non-transitory computer-readable medium described herein, identifying the set of sequences from the set of resource element groups may include operations, features, means, or instructions for identifying, for each resource element group, one of the set of sequences.

Some examples of the method, apparatuses, and non-transitory computer-readable medium described herein may further include operations, features, means, or instructions for identifying a sequence received in a resource element group of the set of resource element groups, identifying an index associated with the resource element group, and mapping the sequence in the resource element group to a coded symbol of the block of coded symbols according to the identified index.

In some examples of the method, apparatuses, and non-transitory computer-readable medium described herein, the set of resource element groups span six physical resource blocks in a frequency domain and four OFDM symbol periods in a time domain.

In some examples of the method, apparatuses, and non-transitory computer-readable medium described herein, the set of resource element groups span six physical resource blocks in a frequency domain and five OFDM symbol periods in a time domain.

In some examples of the method, apparatuses, and non-transitory computer-readable medium described herein, the block of source symbols include symbols of a non-binary alphabet.

In some examples of the method, apparatuses, and non-transitory computer-readable medium described herein, a block size of the codeword may be greater than a block size of the block of source symbols.

Some examples of the method, apparatuses, and non-transitory computer-readable medium described herein may further include operations, features, means, or instructions for decoding the data portion based on the identifier of the UE.

In some examples of the method, apparatuses, and non-transitory computer-readable medium described herein, a numerology of the preamble portion may be different from a numerology of the data portion.

In some examples of the method, apparatuses, and non-transitory computer-readable medium described herein, the data portion is received on a PUSCH.

DETAILED DESCRIPTION

Figure 1:
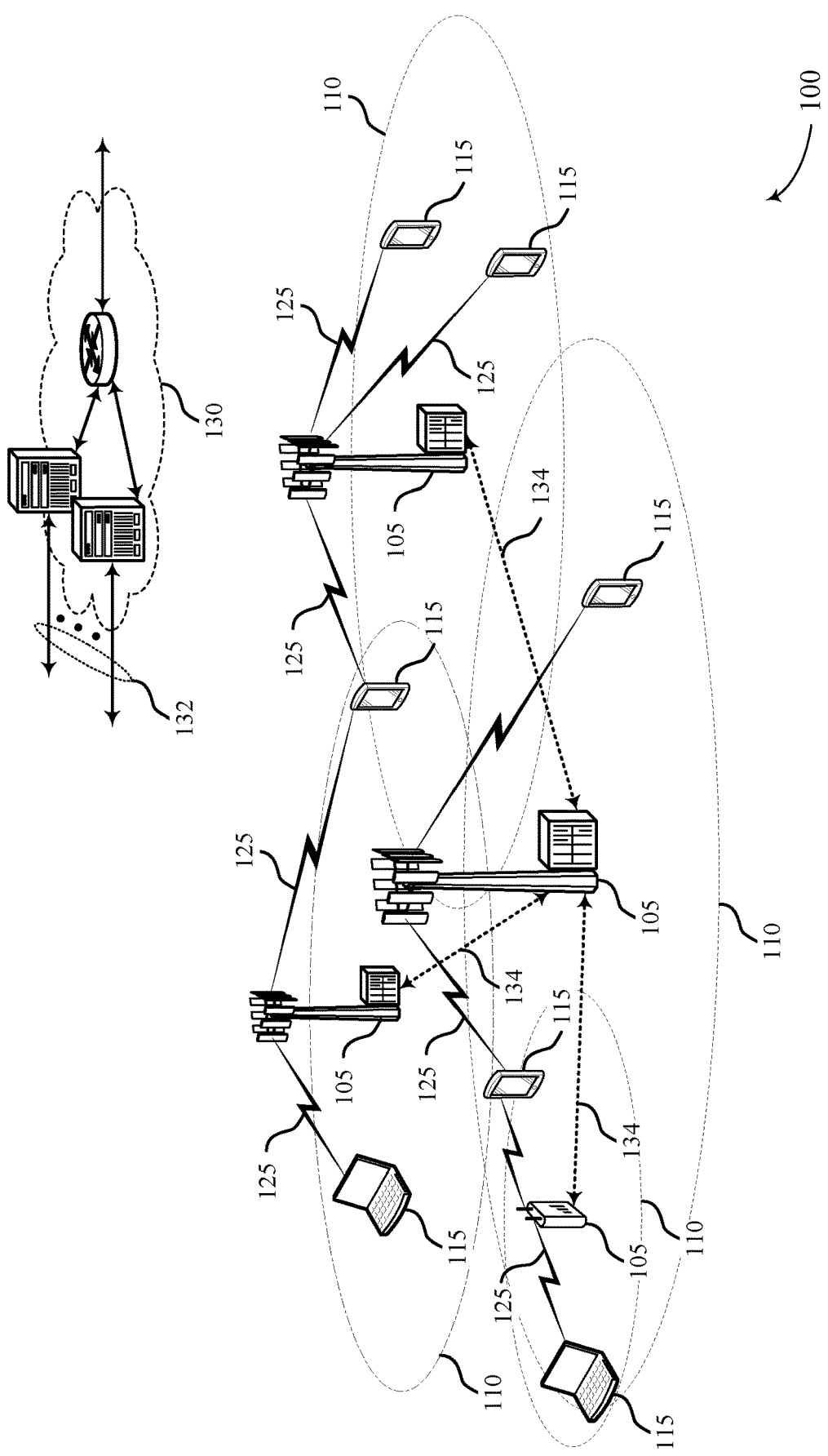
FIG. 1 illustrates an example of a system for wireless communications that supports scalable preamble design for random access in accordance with aspects of the present disclosure.

Some wireless systems support establishment of communications between a user equipment (UE) and a base station using a random access procedure that may enable a UE to synchronize with the base station. The UE may initiate the random access procedure when it is first powered up (e.g., at initial access), during a handover of the UE from one base station or cell to another base station or cell, when the UE needs to re-establish communications after an interruption, or under various other conditions, for example.

In some cases, a random access procedure may include transmission of a series of four handshake messages between the UE and the base station. Such messages may be unscheduled, for example, and may be transmitted on a shared random access channel (RACH). In a four-message random access procedure, the first message may be a message transmitted from the UE to the base station and may include a preamble waveform (e.g., a preamble sequence) that identifies the UE. The second message may be transmitted from the base station to the UE and may acknowledge receipt of the preamble and allocate transmission resources to the UE. The third message may be another message transmitted from the UE to the base station and may include a request for a radio resource control (RRC) connection. The fourth message may be transmitted from the base station to the UE and may include an RRC connection response. Once the fourth message is received and decoded by the UE, the UE may begin communications with the base station in, for example, RRC connected mode. This random access procedure may be referred to as a four-step random access procedure.

In some cases, it may be desirable or beneficial to reduce the latency associated with performing a random access procedure, the number of listen-before-talk (LBT) procedures associated with performing a random access procedure, or both. Such reductions may improve communication efficiency and may be particularly useful for latency-sensitive communications. Thus, in some examples, a contention-based or uncoordinated random access procedure, such as a two-step random access procedure (e.g., a two-step RACH procedure), may be performed to reduce the latency associated with the random access procedure.

A contention-based or uncoordinated random access procedure, such as a two-step random access procedure, may use a first transmission (e.g., an uplink message) transmitted by a UE to a base station, followed by a second transmission (e.g., a downlink response) transmitted by the base station responsive to the first transmission. Like the messages associated with a four-message random access procedure, the first transmission and the second transmission may also be unscheduled. In a contention-based or uncoordinated random access procedure, an uplink message may include a preamble (e.g., a preamble portion) and data (e.g., a data portion, a payload of the uplink message) used by the base station for random access corresponding to the UE. In some examples, the data associated with the two-step random access procedure may be mapped to a physical uplink shared channel (PUSCH). In some cases, the uplink message may thereby combine features of the first message and the third message of a conventional four-step procedure. The base station may then respond to uplink messages received from the UE with a downlink response (e.g., a downlink response message), which may be included in a physical downlink shared channel (PDSCH).

In some cases, (e.g., when using contention-based or uncoordinated random access) multiple UEs may each attempt to transmit separate uplink messages to the base station, which may include transmissions over non-orthogonal communication resources (e.g., overlapping portions of a radio frequency spectrum band during overlapping time intervals). Collisions between uplink messages from different UEs may occur, for example where a same preamble is used by more than one UE in separate transmissions using the same or overlapping communication resources (e.g., overlapping at least in part in a frequency domain and time domain). Collisions may be increasingly common where a large number of UEs are in close proximity. A wireless communication system may employ various techniques to reduce collisions of uplink messages using non-orthogonal communication resources. For example, a UE may transmit information identifying the UE (e.g., that indicates an identifier of the UE, such as a radio network temporary identify (RNTI) associated with the UE) in a random access preamble, which may be coded, resulting in various different sequences representing the UE identifier mapped to a set of resource element groups of the preamble.

To support the described techniques for contention-based or uncoordinated random access, a set of sequences may be based at least in part on a selection or determination by the UE, where such a selection or determination may be based at least in part on a set of options (e.g., values for parameters) indicated by a base station (e.g., a preamble configuration signaled by the base station, which may be cell-specific). In other words, the sequences of a particular preamble transmitted by the UE (e.g., the selection from a set of indicated options) may not be coordinated by a base station. Such coding and mapping may be configured to reduce collisions between UEs that may be attempting to access the wireless communication system, increasing capacity and coverage. Such coding and mapping may also improve the ability for a base station to detect request messages of a random access procedure (e.g., uplink messages) from UEs that may be attempting to access the wireless communication system over non-orthogonal communication resources (e.g., in a contention-based manner).

Aspects of the disclosure are initially described in the context of a wireless communications system. Certain aspects of the disclosure are also described in the context of preamble coding and mapping across resource element groups. Aspects of the disclosure are further illustrated by and described with reference to apparatus diagrams, system diagrams, and flowcharts that relate to a two-step random access procedure.

FIG. 1 illustrates an example of a wireless communications system 100 that supports scalable preamble design for random access in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, which may include operation in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

When requesting access to the wireless communications system 100, a UE 115 may transmit an uplink message (e.g., an uplink request message, an access request message), which may include a transmission over a random access channel (RACH). The uplink message may include a preamble portion that is coded and mapped to a set of resource element groups, and a data portion that may be decoded based at least in part on the preamble portion. The coding and mapping may include a set of sequences that may be received by a base station 105, and decoded by the base station 105 to determine an identifier of the UE 115 (e.g., using various interference cancellation techniques). The base station 105 may use the identifier of the UE 115, or some other portion or characteristic of the preamble portion, to decode the data portion of the uplink message, which the base station 105 may use to identify further information about the UE 115 for determining a downlink response to the uplink message.

Figure 2:
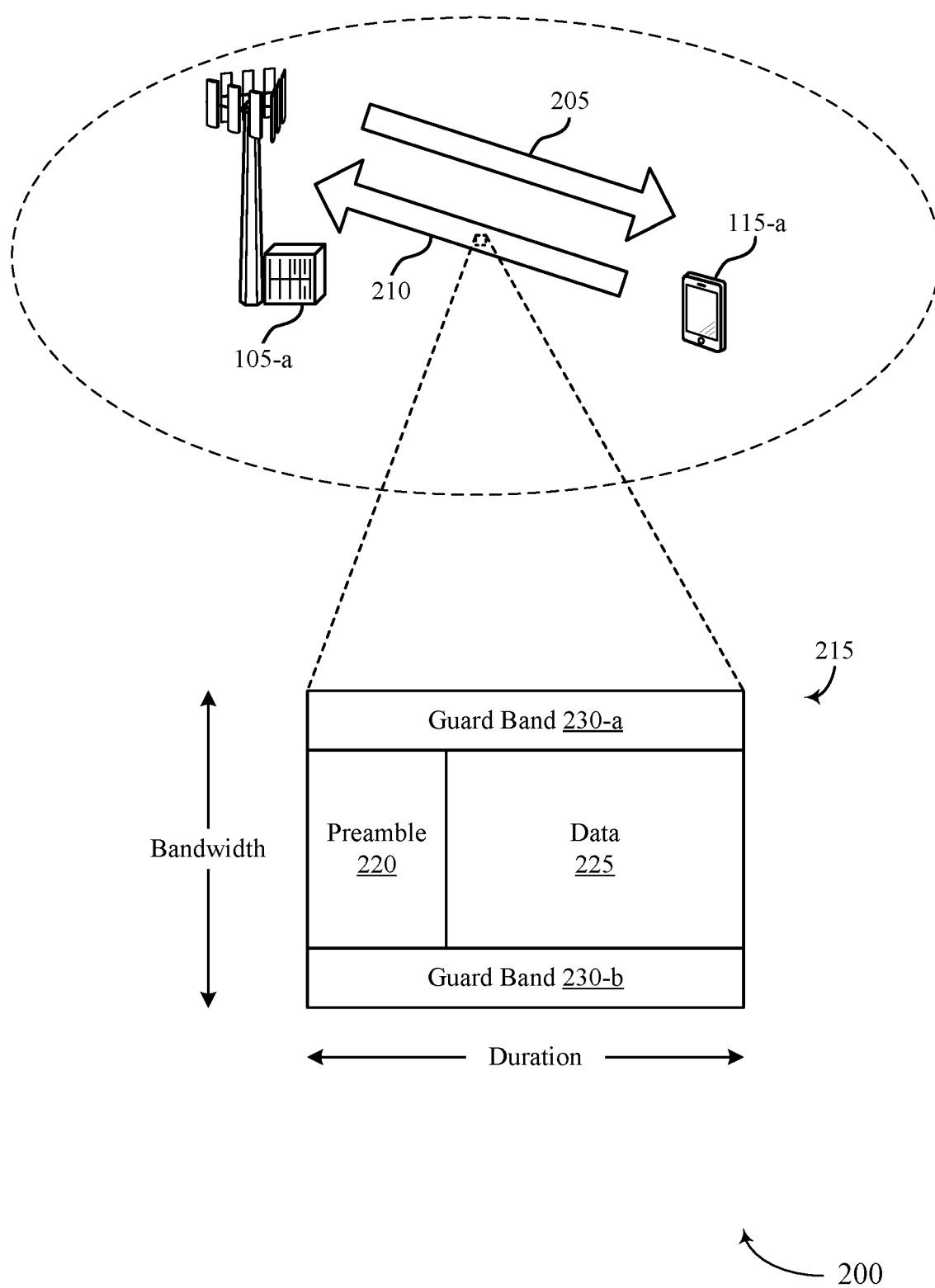
FIG. 2 illustrates an example of a wireless communications system that supports scalable preamble design for random access in accordance with aspects of the present disclosure.

FIG. 2 illustrates an example of a wireless communications system 200 that supports scalable preamble design for random access in accordance with aspects of the present disclosure. In some examples, the wireless communications system 200 may implement aspects of wireless communications system 100. Wireless communications system 200 includes UE 115-a and base station 105-a, which may be respective examples of a UE 115 and a base station 105 as described herein. The wireless communications system 200 may support transmissions 205 by the base station 105-a that may be received by the UE 115-a, and transmissions 210 by the UE 115-a that may be received by the base station 105-a.

The wireless communications system 200 may support a contention-based or uncoordinated random access procedure, such as a two-step random access procedure, where the UE 115-a may transmit an uplink message (e.g., an access request message, via a transmission 210), and the base station 105-a may transmit a downlink response (e.g., an access response message, via a transmission 205) based at least in part on (e.g., responsive to) receiving the uplink message. In some examples, an uplink message of the random access procedure may be transmitted at least in part over a physical random access channel (PRACH). In some examples, a random access channel may refer to a lower layer (e.g., physical layer) channel of a communications protocol, and may be associated with an arrangement of resources in a frequency and time domain configured for random access transmissions (e.g., contention-based or uncoordinated random access transmissions). In various examples, a random access procedure may be referred to as a random access channel (RACH) procedure, and a random access request may be referred to as a RACH transmission.

In some examples, a contention-based or uncoordinated random access procedure (e.g., a two-step random access procedure) may be performed using non-orthogonal multiple access (NOMA) techniques, where random access transmissions may be transmitted by different devices (e.g., uplink messages transmitted by multiple UEs 115) using communication resources that are overlapping in the frequency and time domain. An uplink message of the random access procedure may include a preamble (e.g., a PRACH preamble), which may be used for UE activity detection, time or frequency offset estimation, channel estimation, or scheduling requests for grant-based HARQ. In some examples of the random access procedures with NOMA, an uplink message may also include data (e.g., identification data or configuration data associated with the UE 115-a), which may be a relatively small or otherwise limited amount of data. The data may be communicated via a physical uplink shared channel (PUSCH). In some examples of the random access procedures, timing advance associated with other random access procedures (e.g., four-step random access procedures) may not be required, and such transmissions of an uplink message may be performed (e.g., by the UE 115-a) in an "RRC Inactive" state.

To support contention-based or uncoordinated random access techniques, such as two-step random access techniques, spectral efficiency and transceiver complexity associated with access procedures may need to be considered. In some examples, a demodulation reference signal (DMRS) may be insufficient to support NOMA transmission without timing advance. In some examples, a PRACH preamble may have a larger overhead than DRMS, but certain designs may still be insufficient to support relatively low probability collision of NOMA transmissions with random selection of multiple access signatures. Further, contention resolution may incur latency and signaling overhead. In some examples, the capacity for the wireless communications system 200 to support contention-based or uncoordinated random access (e.g., two-step random access) by multiple UEs 115 may be limited by the pool size of preambles associated with random access requests (e.g., preambles that may be available for selection by UEs 115). For example, certain legacy techniques may be associated with a pool of 64 possible preambles for random access requests, which may be insufficient for preventing collisions, and may require additional contention resolution. Thus, the wireless communications system 200 may employ a new physical layer design to support two-step random access with NOMA, which may improve coverage and capacity of contention-based or uncoordinated random access in the wireless communications system 200.

In accordance with the present disclosure, as part of an access procedure (e.g., a RACH procedure) of the wireless communications system 200, the UE 115-a may transmit an uplink message 215, including a preamble 220 (e.g., a preamble portion) that supports scalable preamble designs such as those described herein. In some examples, the preamble 220 may be communicated via a PRACH, and may be referred to as a PRACH preamble. The preamble 220 may be accompanied by data 225 (e.g., a data portion), which in some examples may be communicated on or via, mapped to, or otherwise associated with a physical uplink shared channel (PUSCH). In some examples, data 225 may be referred to as PUSCH data (e.g., PUSCH data associated with the access procedure), and may correspond in some cases to information carried by a message 3 of a four-step RACH procedure. Thus, in some examples, the uplink message 215 may include a PUSCH waveform (e.g., associated with the data 225), which may correspond to a set of OFDMA symbols mapped to communication resources in the time and frequency domain according to a PUSCH configuration. In some examples, the PUSCH waveform may be encoded (e.g., by the UE 115-a), based at least in part on an identifier of the UE 115-a. More generally, in various examples, the data 225 may be encoded based at least in part on an identifier of the UE 115-a. Accordingly, the data 225 (e.g., a PUSCH waveform) may be decoded (e.g., by the base station 105-a) based at least in part on the identifier of the UE 115-a indicated by the preamble 220 and decoded from the preamble 220 by the base station 105-a.

In various examples, the preamble 220 can use similar or different numerology as the data 225 (e.g., a PRACH for communicating the preamble 220 may have similar or different numerology as a PUSCH for communicating the data 225). For example, a preamble 220 may, in some examples, use narrower tones or tone spacing (and correspondingly longer symbol duration) than data 225. However, in some examples, the preamble 220 may use the same or similar tones or tone spacing (and corresponding symbol duration) as data 225 (e.g., 15 kHz, 30 kHz, or other tones or tone spacing).

Data 225 may be decoded or otherwise interpreted (e.g., by the base station 105-a) based at least in part on the preamble 220 (e.g., a UE identifier signaled or indicated by the preamble 220). For example, the preamble 220 may include signaling based at least in part on an identifier of the UE 115-a (e.g., a UE-ID), which may be a RNTI, an identifier specifically associated with random access (e.g., an RNTI configured for use in two-step RACH, such as a random access RNTI (RA-RNTI)), an identifier indicated to the UE 115-a by the base station 105-a, or any other type of identifier that identifies the UE 115-a to the base station 105-a. As described herein, the preamble 220 may be include sequences associated with coded source symbols that are mapped to a pattern of resource element groups (REGs), which may be based at least in part on a selection or determination performed by the UE 115-a, an identifier of a cell of the base station 105-a, an index of a resource element group, and other parameters.

As illustrated, the uplink message 215 may be associated with a bandwidth, which may correspond to a system bandwidth, or other bandwidth associated with a PRACH, PUSCH, or other physical channel configuration. In some examples, the uplink message 215 may be associated with guard bands 230 (e.g., guard band 230-a, guard band 230-b), which may refer to resources in the frequency domain that are associated with a system bandwidth (e.g., a channel bandwidth, a carrier bandwidth), but are not used to carry signaling of the uplink message 215. As illustrated, the uplink message 215 may also be associated with a duration, which may correspond to a slot duration of a contention-based or uncoordinated random access procedure, such as a two-step RACH procedure.

In some examples, the preamble 220 may support scalable designs that are based on signaling by the base station 105-a. For example, system information such as cell-specific preamble configurations may signaled by the base station 105-a (e.g., via configuration signaling of a transmission 205), which may be performed by a broadcast transmission. In some examples, the base station 105-a may broadcast cell-specific preamble configurations in a system information block (SIB). In other words, the base station 105-a may identify at least one parameter value to be used (e.g., by the UE 115-a) to generate a preamble 220, and the base station 105-a may transmit a configuration providing the at least one parameter value. Accordingly, an uplink message 215 received by the base station 105-a may be based at least in part on the transmitted configuration. Based at least in part on system information signaling received at the UE 115-a, the UE-115 may generate a preamble based on an identifier of the UE 115-a, and may scramble the data 225 with a cell-specific and UE-specific scrambling sequence. In addition to bit-level or symbol-level scrambling, other multiple signatures can be applied to the data 225, such as a spreading code, an interleaving pattern, or other processing.

The base station 105-a may receive one or more uplink messages 215 (e.g., from the UE 115-a, from other UEs 115, not shown), and may perform various detection operations associated with the two-step random access procedure. For example, the base station 105-a may receive uplink messages 215 with a NOMA receiver, and perform detection operations (e.g., interference cancellation operations) associated with the preamble 220. For example, the base station 105-a may determine a channel estimation based at least in part on the preamble 220, and decode the data 225 based at least in part on the identifier of the UE 115-a and the determined channel estimation.

In some examples, the base station 105-a may start with a subset of preambles that are detected with higher signal-to-interference-plus-noise ratio (SINR). The base station 105-a may then perform a cancellation of preambles detected with higher SINR, such as an arithmetic subtraction of such detected preambles from a received signal. The base station 105-a may then detect preambles with lower SINR based on the received signal as modified by the cancellation of the already-detected preambles. Thus, the base station 105-a may orthogonalize uplink messages 215 that are superimposed on a set of communication resources. Such a data-aided interference cancellation may be applied to iterative preamble detection and channel estimation (e.g., for other UEs 115, not shown). In some examples, the generation of preambles 220 may be configured to randomize or whiten interference between different preambles 220 (e.g., preambles 220 transmitted by different UEs 115).

In one example of scalable preamble designs, the UE 115-a may map its UE-ID (e.g., an identifier of the UE 115-a, a RNTI related to two-step RACH) to a block of source symbols according to the following:

$$A = [a_0, \ldots, a_{K-1}] \quad (1)$$

where each a represents a source symbol, and accordingly A may represent a set of K source symbols (e.g., where K may refer to a block size of the block of source symbols A). In various examples, the source symbols a may be associated with a binary or non-binary alphabet. Using a binary alphabet, for example, each source symbol a may have a value of 0 or 1, and the values across the block of source symbols A may be based at least in part on the UE-ID of the UE 115-a. Using a QPSK or 4-value alphabet, for example, each source symbol a may have a value of 0, 1, 2, or 3, and the values across the block of source symbols A may be based at least in part on the UE-ID of the UE 115-a. More generally, each of the source symbols a of the block of source symbols A may be associated with a particular cardinality, and the values across the block of source symbols A may be generated by the UE 115-a based at least in part on the UE-ID of the UE 115-a according to the particular cardinality. In some examples, the values across the block of source symbols A may be further based at least in part on a cell-specific mapping or identifier.

In one example (e.g., for Q1), the mapping to source symbols may be a function of UE-ID and a resource index of 2-step RACH. Depending on the pool size of distinctive preambles, such a mapping may be a 1:1 mathematical conversion, or may be a combination of 1:1 mapping and a random selection. A mapping function or rule may be configured at the UE 115-a or the base station 105-a (e.g., as specified in a communications standard) as a mathematical formula or a lookup table. The base station 105-a may indicate (e.g., according to signaling of a transmission 205, in a SIB) which formulas or lookup tables are to be used by the UE 115-a for two-step RACH (e.g., for generating the preamble 220).

In one example, closed-form formulas associated with a UE-ID and a resource index for two-step RACH may be calculated by:

$$\text{UE-ID}=f(\text{resource\_index\_2stepRACH}) \quad (2)$$

where, the resource index for two-step RACH may be calculated by:

$$\text{resource\_index\_2stepRACH}=1+s\_\text{id}+14*t\_\text{id}+14*Q*f\_\text{id}+14*Q*P*\text{ul\_carrier\_id} \quad (3)$$

where f(x) can be a generator polynomial of PN sequence for a seed x, s_id may be an index of a first OFDM symbol of the specified preamble (e.g., where $0 \leq s\_id < 14$), t_id may be an index of a first slot of the specified preamble in a system frame (e.g., where $0 \leq t\_id < Q$), f_id may be an index of the specified preamble in the frequency domain ($0 \leq f\_id < P$), and ul_carrier_id may be the uplink carrier used for two-step RACH transmission. The output of the generator polynomial can be used for bits (e.g., binary) to source symbols (e.g., non-binary) mapping, which may be an example of 1:1 mapping. In some examples (e.g., for Q2), a cell-specific configuration may be reflected by the formula f(x), as well as the different selection of P and Q (e.g., a cell-specific selection).

In various examples, the block size K of source symbols a (e.g., the size of block A), the cardinality of source symbols a, or both, may depend on the target collision probability associated with random access operations. In some examples, the base station 105-a may determine such a collision probability, which may include determining a quantity of UEs 115 that may attempt to access the base station 105-a, a cell size associated with the base station 105-a, a timing offset, a traffic pattern, or some other condition or characteristic of communications with the base station 105-a. Thus, in some examples, the base station 105-a may determine an amount of resources for transmitting a preambles 220, such as the block size K, the cardinality of source symbols a, or both, based on various conditions. In other words, each source symbol a may be selected from a set of symbols, where a set size of the set of symbols (e.g., a cardinality) or a block size K of the block of source symbols A, or both may be based at least in part on a target collision probability. The base station 105-a may indicate the determined block size K, the determined cardinality of source symbols a, or both, via signaling that may be received by the UE 115-a (e.g., via a transmission 205, via a broadcast transmission, in a SIB or other cell-specific preamble configuration signaling), thereby providing scalability of preambles based at least in part on determinations made by the base station 105-a.

Thus, according to various examples of the present disclosure, the UE 115-a may map an identifier of the UE 115-a into a block of source symbols, and generate the block of source symbols based at least in part on the identifier of the UE, or a resource index of the two-step RACH, or a combination thereof. After mapping the UE-ID to the block of source symbols A (e.g., and generating the block of source symbols A), the UE 115-a may generate a block code as a function of the block of source symbols A according to the following:

$$C_A = f(A) = [c_0, \ldots c_{N-1}] \quad (4)$$

where each c represents a coded symbol (e.g., a coded source symbol), and accordingly $C_A$ may represent a set of N coded symbols (e.g., a short-length codeword). In some examples, the block size N may be greater than the block size K, which may improve coding gain for detecting the UE-ID. In some examples, each of the coded symbols c may be a non-binary symbol (e.g., having a cardinality greater than two). In various examples, the block size N of coded symbols c (e.g., the size of block $C_A$), the cardinality of coded symbols c, or both, may depend on the target collision probability associated with random access operations. In various examples, the cardinality of source symbols a and the cardinality of coded symbols c may be the same, or may be different.

Each of the coded symbols c may be generated by a forward error correction (FEC) encoder, which may be optimized according to maximal distance separability (MDS), erasure resilience, relatively short length, or a combination thereof. In some examples, the block size N may be related to the block size K according to a particular coding gain, such as a Reed-Solomon coding gain (e.g., satisfying RS(N, K), such as RS (7, 3), RS (15, 3), RS (15, 5), and others). In some examples, each of the coded symbols c may be generated by an MDS encoder or a Reed-Solomon encoder, and an encoder may be configured (e.g., based on signaling from the base station 105-a) according to an input size (e.g., a block size K) and an output size (e.g., a block size N). In some examples, the quantity (N−K) may refer to a number of parity symbols.

The UE 115-a may then map the codeword $C_A$ to N resource element groups (REGs). In other words, each coded symbol c may be mapped to a different (e.g., single) REG. In some examples, such a mapping may be performed based at least in part on a cell-specific mapping arrangement. In some examples, the N coded symbols of the codeword $C_A$ may be used to select N short sequences, which may be transmitted across the N REGs. For example, each coded symbol c may be mapped to one out of a finite-size of orthogonal sequences, and each of the sequences may be associated with a particular waveform that may be transmitted as part of the preamble 220. The orthogonal sequences may include, for example, Zadoff-Chu sequences having different root indexes and different cyclic shifts. Thus, in some examples, the preamble 220 may include a concatenation of sequences, which may be associated with a combination of waveforms indicative of the UE-ID of the UE 115-a.

The mapping of the codeword $C_A$ to the NREGs may be a function of coded symbol index (n) and the cell ID of the base station 105-a, which may support reducing inter-symbol correlation of asynchronous reception or reducing inter-cell interference. For example, each unique code symbol index may map to a different set of orthogonal sequences, which may support reducing interference among asynchronous preambles (e.g., as compared with a random access procedure that relies on a random selection from a limited number of preamble sequences based on a root index). Further, neighboring cells may consider a different permutation order of symbol mapping, which may reduce inter-cell interference.

The wireless communications system 200 may support various configurable parameters for mapping coded symbols c to resource element groups, which may include identifying an index indicated by the coded symbol c, and identifying at least one parameter value associated with the identified index. In some examples, a sequence may be generated based at least in part on the at least one parameter. In one example, the configurable parameters of REG mapping may include at least the set of a comb index, a root index, and a cyclic shift. Table 1 illustrates one example of configurable parameters of such REG mapping, where each coded symbol c may be associated with a cardinality of 16, and accordingly each coded symbol c may have a value (e.g., index k) from 0 to 15:

TABLE 1

Example REG Mapping Parameters

| | Configurable Parameters of REG Mapping Table | | |
|---|---|---|---|
| Index k | Comb index $\alpha_k$ | Root $\mu_k$ | Cyclic Shift $\eta_k$ |
| 0 | 1 | a | 0 |
| 1 | 1 | a | 3 |
| 2 | 1 | a | 6 |
| 3 | 1 | a | 9 |
| 4 | 1 | b | 0 |
| 5 | 1 | b | 3 |
| 6 | 1 | b | 6 |
| 7 | 1 | b | 9 |
| 8 | 2 | a | 0 |
| 9 | 2 | a | 3 |
| 10 | 2 | a | 6 |
| 11 | 2 | a | 9 |
| 12 | 2 | b | 0 |
| 13 | 2 | b | 3 |
| 14 | 2 | b | 6 |
| 15 | 2 | b | 9 |

In some examples, the dimensioning of cyclic shift or comb sparsity level may depend on the range of timing offset for the random access procedure (e.g., timing offset associated with a two-step RACH procedure). In some examples, sequences sharing the same comb index may need to have sufficient auto correlation or cross correlation. In various examples, each REG may re-use the same mapping table, or each REG may use different mapping tables. In some examples, a mapping table may be cell-specific (e.g., based on configuration signaling received over a transmission 205 from the base station 105-a), which may support randomizing the inter-cell interference.

The base station 105-a may receive the preamble 220, and decode the preamble 220 to detect the UE-ID associated with the UE 115-a. The detected UE-ID may then be used by the base station 105-a to recover or otherwise decode (e.g., descramble) the data 225 (e.g., to decode or descramble a PUSCH, to identify further identification or configuration information regarding the UE 115-a). By employing the described techniques for scalable preamble design for random access, the wireless communications system 200 may support balancing dual motivations of relatively low overhead and relatively low collision probability associated with preambles 220 from different UEs 115. For example, the base station 105-a may configure an amount of resources for preambles 220 based at least in part on communication characteristics or conditions (e.g., as identified or detected by the base station 105-a), which may include scaling up or down an amount of resources for preambles 220 based at least in part on a collision probability. Further, UEs 115 may generate preambles of an uplink message of a contention-based or uncoordinated random access procedure (e.g., RACH procedure) according to a concatenation of transmission sequences across a set of REGs, where such a concatenation provides a substantially larger pool of preamble possibilities than when a single sequence is used, thereby reducing the likelihood of collisions with neighboring UEs 115.

In some examples, the described techniques may support hybrid receiver processing, such as bi-directional decoding and self-interference cancellation (SIC) within a given slot for contention-based or uncoordinated random access (e.g., a given two-step RACH slot). For preambles 220 sent from nearby UEs (e.g., relatively close to a base station 105), the described techniques may be associated with early and deterministic time of arrival (ToA) and optimized transmission parameters. Relating to a collision from a relatively far away UE, "interference suppression" may be supported by the selection of orthogonal/quasi-orthogonal sequences for each RACH symbol. For preambles 220 sent from relatively far UEs 115 (e.g., near a cell edge), the described techniques may be associated with late and deterministic ToA, and a reversed direction of decoding. Relating to a collision from a relatively nearby UE 115, "interference suppression" may be also supported by the selection of orthogonal/quasi-orthogonal sequences for each RACH symbol.

Figure 3:
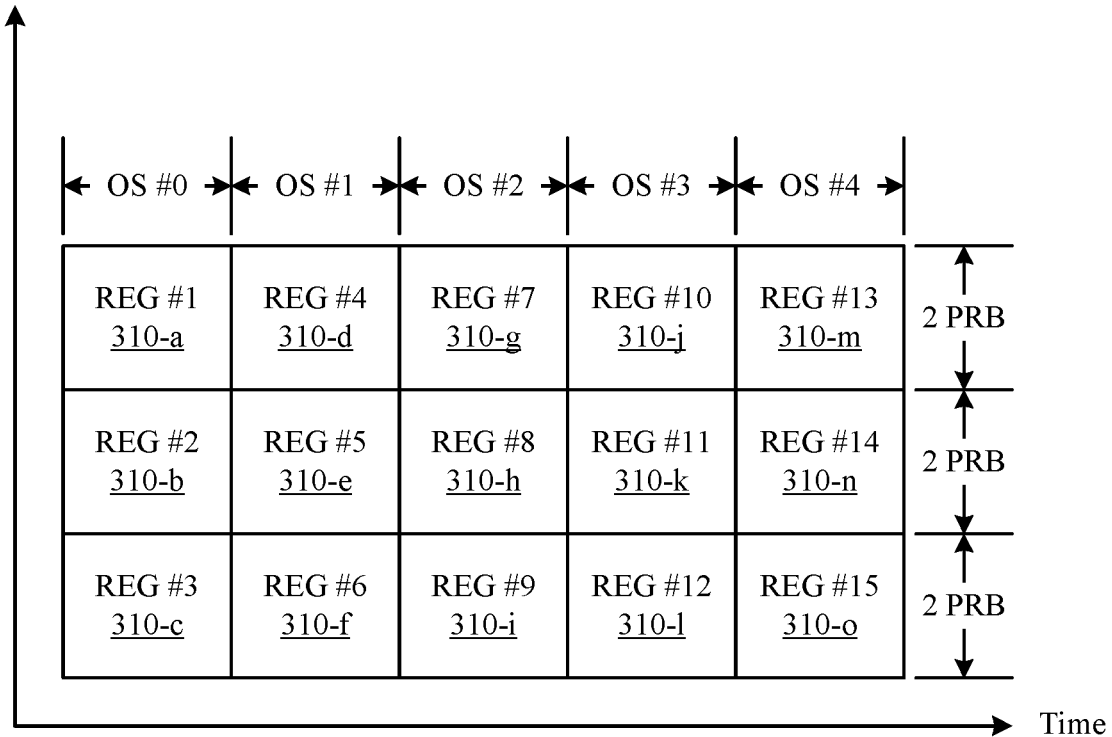
FIG. 3 illustrates an example of a random access preamble mapping that supports scalable preamble design for random access in accordance with aspects of the present disclosure.

FIG. 3 illustrates an example of a random access preamble mapping 300 that supports scalable preamble design for random access in accordance with aspects of the present disclosure. In some examples, the random access preamble mapping 300 may implement aspects of wireless communications system 100 or wireless communications system 200 described with reference to FIGS. 1 and 2.

The random access preamble mapping 300 may be an example of a contention-based or uncoordinated random access preamble, such as a two-step RACH preamble, that may be mapped to fifteen REGs 310 (e.g., REG 310-a through REG 310-o). In the example of random access preamble mapping 300, each REG spans two physical resource blocks (PRBs) in frequency and one OFDM symbol (OS) in time. Thus, the random access preamble mapping 300 may be an example of a mapping that spans five OFDM symbols (e.g., five OFDM symbols in a time domain, five OFDM symbol durations), and six PRBs (e.g., six PRBs in a frequency domain, a bandwidth of 6 PRBs). The random access preamble mapping 300 illustrates an example where REGs 310 are ordered across PRBs within a first symbol duration (e.g., REGs #0, #1, and #2 associated with OS #0), then along a PRBs within a second symbol duration (e.g., REGs #4, #5, and #6 associated with OS #1), and so on. However, different REG mappings in accordance with the present disclosure may be ordered in a different manner.

The fifteen REGs 310 may correspond to a block size of coded symbols of N=15, and each coded symbol c of a codeword C may be mapped to a different REG. For example, considering a codeword $C_A=[c_0 \ldots c_{14}]$, $c_0$ may be mapped to REG #1, $c_1$ may be mapped to REG #2, and so on. In some examples, the mapping of 15 REGs may satisfy the coding constraints of RS(15, 7), such as when a block of source symbols A has a block size of K=7. Each value of a coded symbol c may be associated with a particular sequence, which may be associated with a particular waveform that may be transmitted by a UE 115 over the given REG 310.

The random access preamble mapping 300 may support a larger number of possible preambles than preamble designs for four step RACH, which may be associated with a lower probability of preamble collisions.

Figure 4:
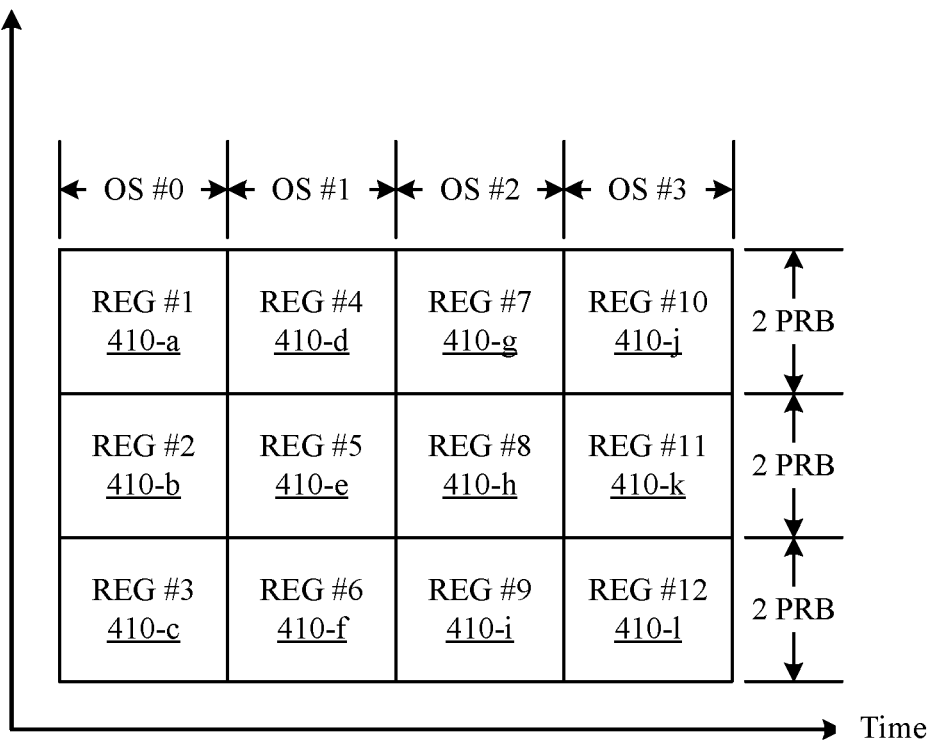
FIG. 4 illustrates an example of a random access preamble mapping that supports scalable preamble design for random access in accordance with aspects of the present disclosure.

FIG. 4 illustrates an example of a random access preamble mapping 400 that supports scalable preamble design for random access in accordance with aspects of the present disclosure. In some examples, the random access preamble mapping 400 may implement aspects of wireless communications system 100 or wireless communications system 200 described with reference to FIGS. 1 and 2.

The random access preamble mapping 400 may be an example of a contention-based or uncoordinated random access preamble, such as a two-step RACH preamble, that may be mapped to twelve REGs 410 (e.g., REG 410-a through REG 310-1). In the example of random access preamble mapping 400, each REG spans two physical resource blocks (PRBs) in frequency and one OFDM symbol (OS) in time. Thus, the random access preamble mapping 400 may be an example of a mapping that spans four OFDM symbols (e.g., four OFDM symbols in a time domain, four OFDM symbol durations), and six PRBs (e.g., six PRBs in a frequency domain, a bandwidth of 6 PRBs). The random access preamble mapping 400 illustrates an example where REGs 410 are ordered across PRBs within a first symbol duration (e.g., REGs #0, #1, and #2 associated with OS #0), then along a PRBs within a second symbol duration (e.g., REGs #4, #5, and #6 associated with OS #1), and so on. However, different REG mappings in accordance with the present disclosure may be ordered in a different manner.

The twelve REGs 310 may correspond to a block size of coded symbols of N=12, and each coded symbol c of a codeword C may be mapped to a different REG. For example, considering a codeword $C_A=[c_0 \ldots c_{11}]$, $c_0$ may be mapped to REG #1, $c_1$ may be mapped to REG #2, and so on. In some examples, the mapping of 12 REGs may satisfy the coding constraints of RS(12, 4), such as when a block of source symbols A has a block size of K=4. Each value of a coded symbol c may be associated with a particular sequence, which may be associated with a particular waveform that may be transmitted by a UE 115 over the given REG 410.

The random access preamble mapping 400 may support a relatively fewer number of possible preambles (e.g., as compared with the random access preamble mapping 300), which may be associated with a relatively higher probability of preamble collisions. In some examples, the random access preamble mapping 400 may be associated with a relatively lower overhead (e.g., an overhead associated with 5 OFDM symbols in a frequency domain), compared to the random access preamble mapping 300. In other words, the random access preamble mapping 400 may illustrate an example where shortened RS codes can be used to reduce the overhead of preamble (e.g., a shortening of RS(15, 7) into RS(12,4)). As a result, as compared to the random access preamble mapping 300, the overhead of preambles (e.g., preambles 220 described with reference to FIG. 2) may be reduced to 12 REGs or 4 OFDM symbols.

The random access preamble mapping of FIGS. 3 and 4 may use different REG patterns in other examples to implement the features described herein. For example, REGs may span 1, 2, 4, 5, or more REGs in frequency, in combination with 1, 2, 3, 6, or more REGs in time, by tailoring the total number of REGs to maintain a similar coding gain, or altering the type of coding used. Such features may also be implemented in REGs of various numerologies, or sized according to different numbers of resource elements or PRBs. Additional or alternatively, REGs of the preamble may be discontinuous in time/and or frequency in some example, or be punctured (e.g., by one or more reference signals).

Figure 5:
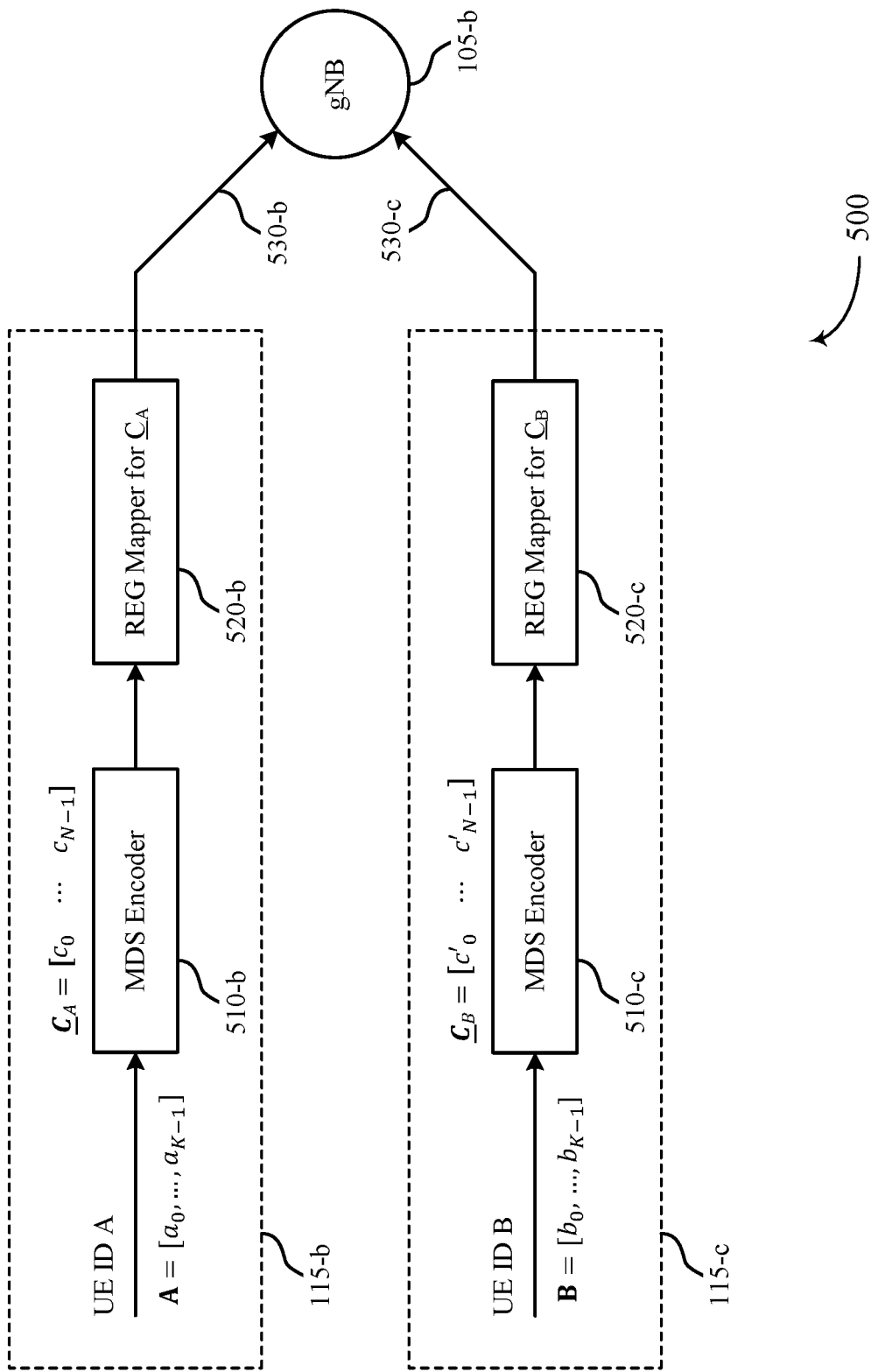
FIG. 5 illustrates an example of a system that supports scalable preamble design for random access in accordance with aspects of the present disclosure.

FIG. 5 illustrates an example of a system 500 that supports scalable preamble design for random access in accordance with aspects of the present disclosure. In some examples, the 500 may implement aspects of wireless communications system 100 or wireless communications system 200 described with reference to FIGS. 1 and 2. The system 500 may include a first UE 115-b and a second UE 115-c, which may be examples of UEs 115 described herein. The system 500 may also include a base station 105-b (e.g., a gNB), which may be an example of base stations 105 described herein.

In the system 500, preamble REG mapping patterns can be generated (e.g., at each of the UE 115-b and the UE 115-c) by a maximal distance separable (MDS) encoder 510. In some examples, an MDS encoder 510 may receive, as an input, a set of source symbols, where a UE-ID may be carried by K source symbols. The MDS encoder 510 may subsequently generate, as an output, a codeword having N coded symbols. At the UE 115-b, for example, a UE-ID "A" may be carried by a block of source symbols $A=[a_0, \ldots, a_{K-1}]$, and the MDS encoder 510-b may generate, as an output, a codeblock of coded symbols $C_A=[c_0 \ldots c_{N-1}]$. At the UE 115-c, for example, a UE-ID "B" may be carried by a block of source symbols $B=[b_0, \ldots, b_{K-1}]$, and the MDS encoder 510-b may generate, as an output, a codeblock of coded symbols $C_B=[c'_0 \ldots c'_{N-1}]$. Each of the UE-IDs may be used by the respective UE 115 to scramble data (e.g., to be transmitted on a PUSCH) of an uplink message associated with a contention-based or uncoordinated random access procedure, such as a two-step RACH procedure.

In some examples, mapping patterns may be generated by Reed-Solomon codes. In some examples, (N–K) parity symbols may provide forward error correction capability for multi-user detection of contention-based access. In some examples, puncturing or interleaving may be applied to the output of MDS encoder 510 (e.g., to a codeword).

Each of the codewords (e.g., $C_A$ and $C_B$) may be represented by a sequence of orthogonal or quasi-orthogonal waveforms. Such waveforms may be associated with Chu sequences having different cyclic shifts, chirp sequences with different pattern, PN sequences, Walsh codes, and others, which may be based at least in part on configuration signaling received from the base station 105-b. The coded symbols (e.g., c, c') may be mapped to REGs by the respective UEs 115, such that each of the REGs is associated with one of the orthogonal or quasi-orthogonal waveforms. In various examples, the UEs 115 may perform mapping of coded symbols to REGs (e.g., at a respective REG Mapper 520), such as a mapping to REGs illustrated by the random access preamble mapping 300 or random access preamble mapping 400 described with reference to FIGS. 3 and 4. In some examples, random access preamble mapping may be based at least in part on an identifier of a cell of a base station an index of the resource element group, or various combinations thereof. Thus, the combination of orthogonal or quasi orthogonal waveforms may be included in a respective uplink message 530 (e.g., a preamble 220 of an uplink message 215 as described with reference to FIG. 2), from one or both of the UE 115-b or the UE 115-c.

The base station 105-b may receive one or both of the respective uplink messages 530, and the base station 105-b may attempt to detect the respective UE-IDs (e.g., "A" and "B"). Based at least in part on the detected UE-ID(s), the base station 105-b may attempt to descramble data of the uplink message (e.g., data 225 as described with reference to FIG. 2, a PUSCH of a two-step random access procedure) based at least in part on the detected UE-IDs.

In some examples, the uplink message 530-b and the uplink message 530-c may be transmitted on non-orthogonal communication resources (e.g., overlapping portions of a radio frequency spectrum band during overlapping time intervals), which may include non-orthogonal communication resources of a random access channel. However, using the described techniques for generating random access preambles, the base station 105-b may support orthogonalizing sequences associated with the preamble of the uplink message 530-b and sequences associated with the preamble of uplink message 530-b (e.g., using NOMA reception techniques such as interference cancellation). In some examples, the sequences of the preambles may be generated based on a configuration that reduces a likelihood of collisions of such preambles (e.g., where sequences associated with the preambles are not able to be orthogonalized). Thus, the base station 105-b may be able to detect both the UE-ID "A" and the UE-ID "B" and proceed with a second step of a contention-based or uncoordinated random access procedure, such as a two-step random access procedure (e.g., transmitting a downlink response based at least in part on the uplink message 530-b, transmitting a downlink response based at least in part on the uplink message 530-c).

Figure 6:
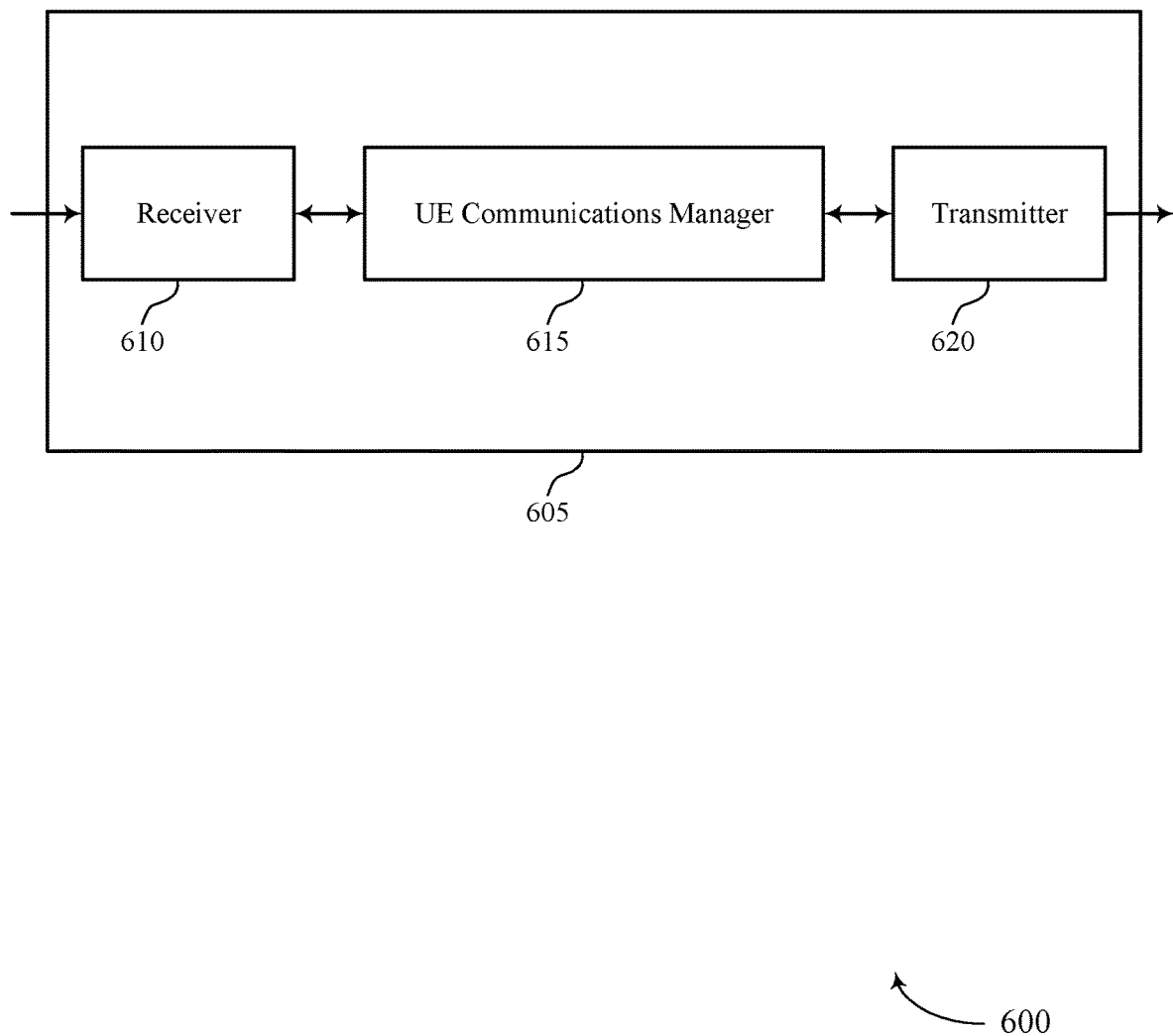
FIGS. 6 and 7 show block diagrams of devices that support scalable preamble design for random access in accordance with aspects of the present disclosure.

FIG. 6 shows a block diagram 600 of a device 605 that supports scalable preamble design for random access in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to scalable preamble design for random access, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify that the UE is configured to use contention-based or uncoordinated random access procedure, such as a two-step RACH procedure, the contention-based or uncoordinated random access procedure including an uplink message and a downlink response, and the uplink message including at least a preamble portion and a data portion, map an identifier of the UE into a block of source symbols, generate the block of source symbols based at least in part on the identifier of the UE, or a resource index of the two-step RACH, or a combination thereof, generate a codeword from the block of source symbols, the codeword including a block of coded symbols, generate a set of sequences, each sequence of the set of sequences based on a value associated with a corresponding coded symbol of the block of coded symbols, and transmit (e.g., via the transmitter 620), as part of the contention-based or uncoordinated random access procedure, the generated set of sequences in a preamble portion of the uplink message. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
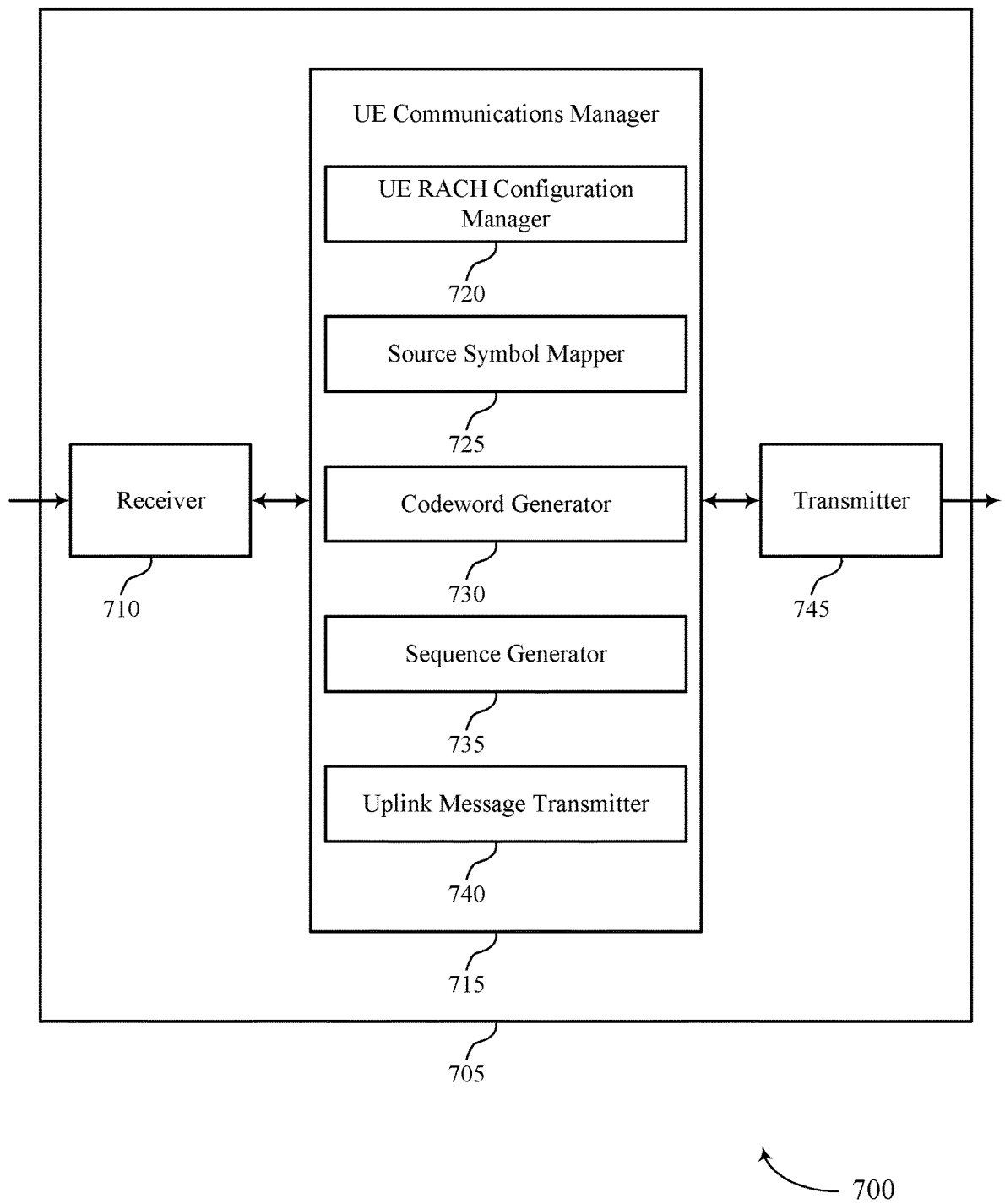

FIG. 7 shows a block diagram 700 of a device 705 that supports scalable preamble design for random access in accordance with aspects of the present disclosure. The device 705 may be an example of aspects of a device 605, or a UE 115 as described herein. The device 705 may include a receiver 710, a UE communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to scalable preamble design for random access, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a UE RACH configuration manager 720, a source symbol mapper 725, a codeword generator 730, a sequence generator 735, and an uplink message transmitter 740. The UE communications manager 715 may be an example of aspects of the communications manager 910 described herein.

The UE RACH configuration manager 720 may identify that the UE is configured to use a contention-based or uncoordinated random access procedure, such as a two-step RACH procedure, the contention-based or uncoordinated random access procedure including an uplink message and a downlink response, and the uplink message including at least a preamble portion and a data portion. In some examples, the data portion is to be transmitted on a PUSCH.

The source symbol mapper 725 may map an identifier of the UE into a block of source symbols, and generate the block of source symbols based at least in part on the identifier of the UE, or a resource index of the contention-based or uncoordinated random access procedure, or a combination thereof.

The codeword generator 730 may generate a codeword from the block of source symbols, the codeword including a block of coded symbols.

The sequence generator 735 may generate a set of sequences, each sequence of the set of sequences based on a value associated with a corresponding coded symbol of the block of coded symbols.

The uplink message transmitter 740 may transmit, as part of the contention-based or uncoordinated random access procedure, the generated set of sequences in a preamble portion of the uplink message.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas. In some examples, the transmitter 745 may include or otherwise support operations of the uplink message transmitter 740.

Figure 8:
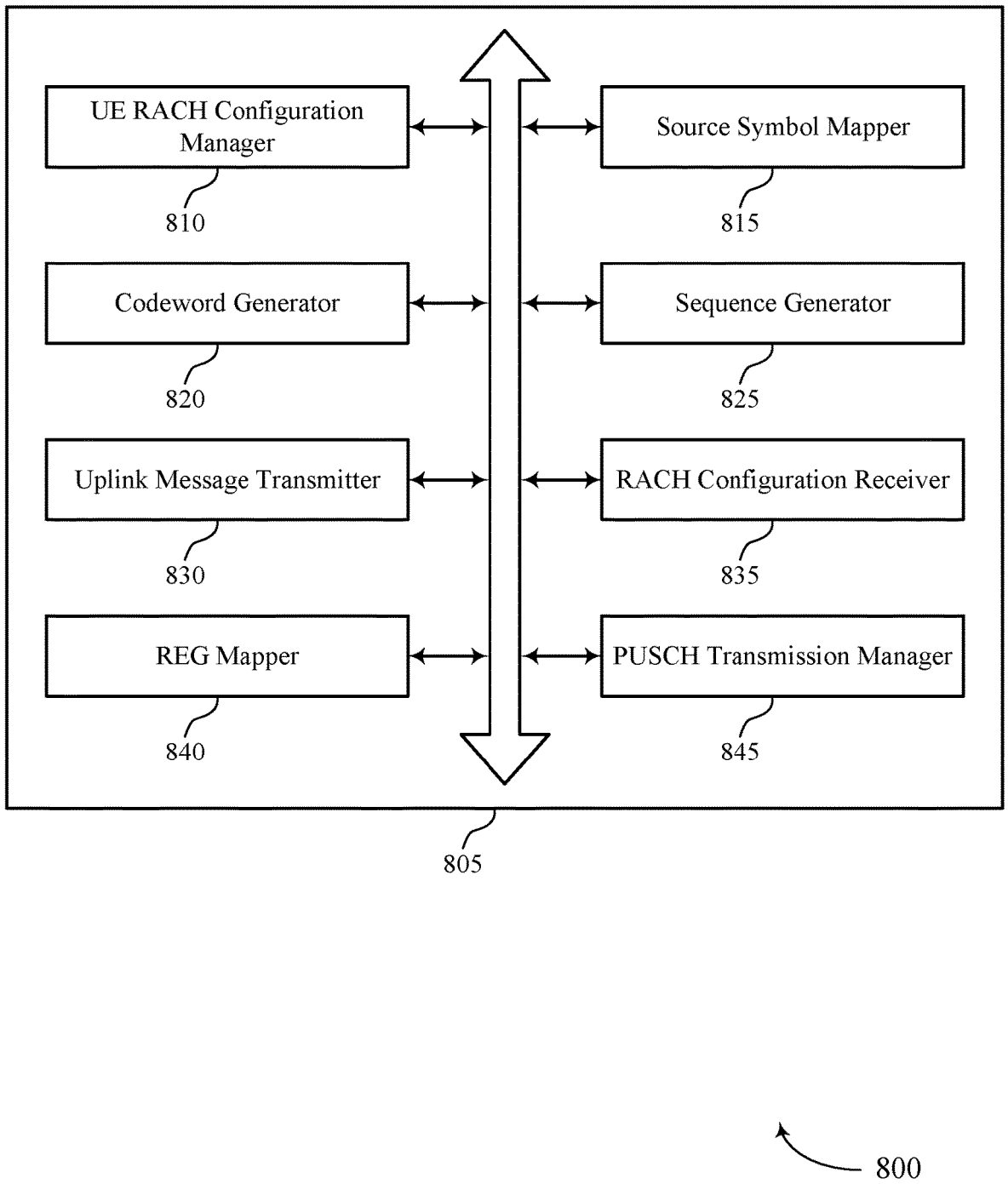
FIG. 8 shows a block diagram of a UE communications manager that supports scalable preamble design for random access in accordance with aspects of the present disclosure.

FIG. 8 shows a block diagram 800 of a UE communications manager 805 that supports scalable preamble design for random access in accordance with aspects of the present disclosure. The UE communications manager 805 may be an example of aspects of a UE communications manager 615, a UE communications manager 715, or a communications manager 910 described herein. The UE communications manager 805 may include a UE RACH configuration manager 810, a source symbol mapper 815, a codeword generator 820, a sequence generator 825, an uplink message transmitter 830, a RACH configuration receiver 835, a REG mapper 840, and a PUSCH transmission manager 845. Each of these modules may communicate, directly or indirectly, with one another (e.g., via one or more buses).

The UE RACH configuration manager 810 may identify that the UE is configured to use a contention-based or uncoordinated random access procedure, the contention-based or uncoordinated random access procedure including an uplink message and a downlink response, and the uplink message including at least a preamble portion and a data portion. In some examples, the data portion is to be transmitted on a PUSCH.

The source symbol mapper 815 may map an identifier of the UE into a block of source symbols, and generate the block of source symbols based at least in part on the identifier of the UE, or a resource index of the contention-based or uncoordinated random access procedure, or a combination thereof. In some cases, the block of source symbols include symbols of a non-binary alphabet. In some cases, each source symbol of the block of source symbols is selected from a set of symbols. In some cases, a set size of the set of symbols, or a block size of the block of source symbols, or both, are based on a target collision probability.

The codeword generator 820 may generate a codeword from the block of source symbols, the codeword including a block of coded symbols. In some cases, a block size of the generated codeword is greater than a block size of the block of source symbols.

The sequence generator 825 may generate a set of sequences, each sequence of the set of sequences based on a value associated with a corresponding coded symbol of the block of coded symbols. In some examples, the sequence generator 825 may identify an index indicated by the coded symbol. In some examples, the sequence generator 825 may identify at least one parameter value associated with the identified index. In some examples, the sequence generator 825 may generate a sequence based on the at least one parameter value. In some cases, the at least one parameter value includes one or more of a comb index, or a root value, or a cyclic shift. In some cases, the sequence includes a finite-size orthogonal sequence.

The uplink message transmitter 830 may transmit, as part of the contention-based or uncoordinated random access procedure, the generated set of sequences in a preamble portion of the uplink message.

The RACH configuration receiver 835 may receive, from a base station, a configuration providing at least one parameter value used to generate a preamble, where the preamble is based on the at least one parameter value.

The REG mapper 840 may map the generated set of sequences to a set of resource element groups of the preamble portion prior to transmitting the generated set of sequences. In some examples, the REG mapper 840 may map, for each sequence of the generated set of sequences, the sequence to one of the set of resource element groups. In some examples, the REG mapper 840 may identify an index associated with a sequence of the generated set of sequences. In some examples, the REG mapper 840 may map the sequence to one of the set of resource element groups based on the identified index. In some examples, the REG mapper 840 may map the sequence to the one of the set of resource element groups based on an identifier of a cell of the base station and the index of the resource element group. In some cases, the set of resource element groups span six physical resource blocks in a frequency domain and four OFDM symbol periods in a time domain. In some cases, the set of resource element groups span six physical resource blocks in a frequency domain and five OFDM symbol periods in a time domain.

The PUSCH transmission manager 845 may generate the data portion based on the identifier of the UE. In some cases, the uplink message may include a PUSCH waveform. In some cases, a numerology of the preamble portion is different from a numerology of the data portion.

Figure 9:
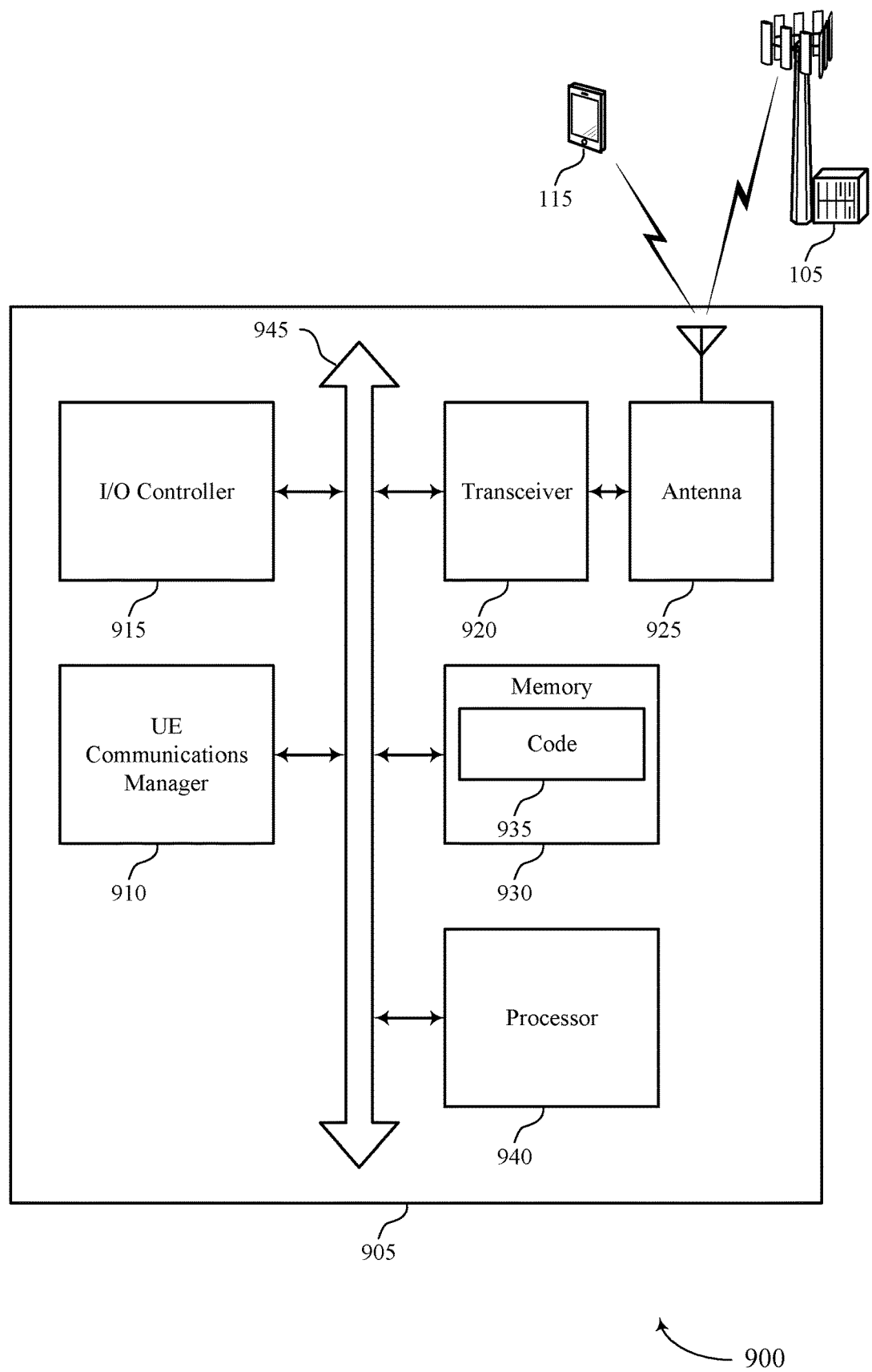
FIG. 9 shows a diagram of a system including a device that supports scalable preamble design for random access in accordance with aspects of the present disclosure.

FIG. 9 shows a diagram of a system 900 including a device 905 that supports scalable preamble design for random access in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may identify that the UE is configured to use a contention-based or uncoordinated random access procedure, such as a two-step RACH procedure, the contention-based or uncoordinated random access procedure including an uplink message and a downlink response, and the uplink message including at least a preamble portion and a data portion, map an identifier of the UE into a block of source symbols, generate the block of source symbols based at least in part on the identifier of the UE, or a resource index of the contention-based or uncoordinated random access procedure, or a combination thereof, generate a codeword from the block of source symbols, the codeword including a block of coded symbols, generate a set of sequences, each sequence of the set of sequences based on a value associated with a corresponding coded symbol of the block of coded symbols, and transmit (e.g., via the transceiver 920), as part of the contention-based or uncoordinated random access procedure, the generated set of sequences in a preamble portion of the uplink message.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting scalable preamble design for random access).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
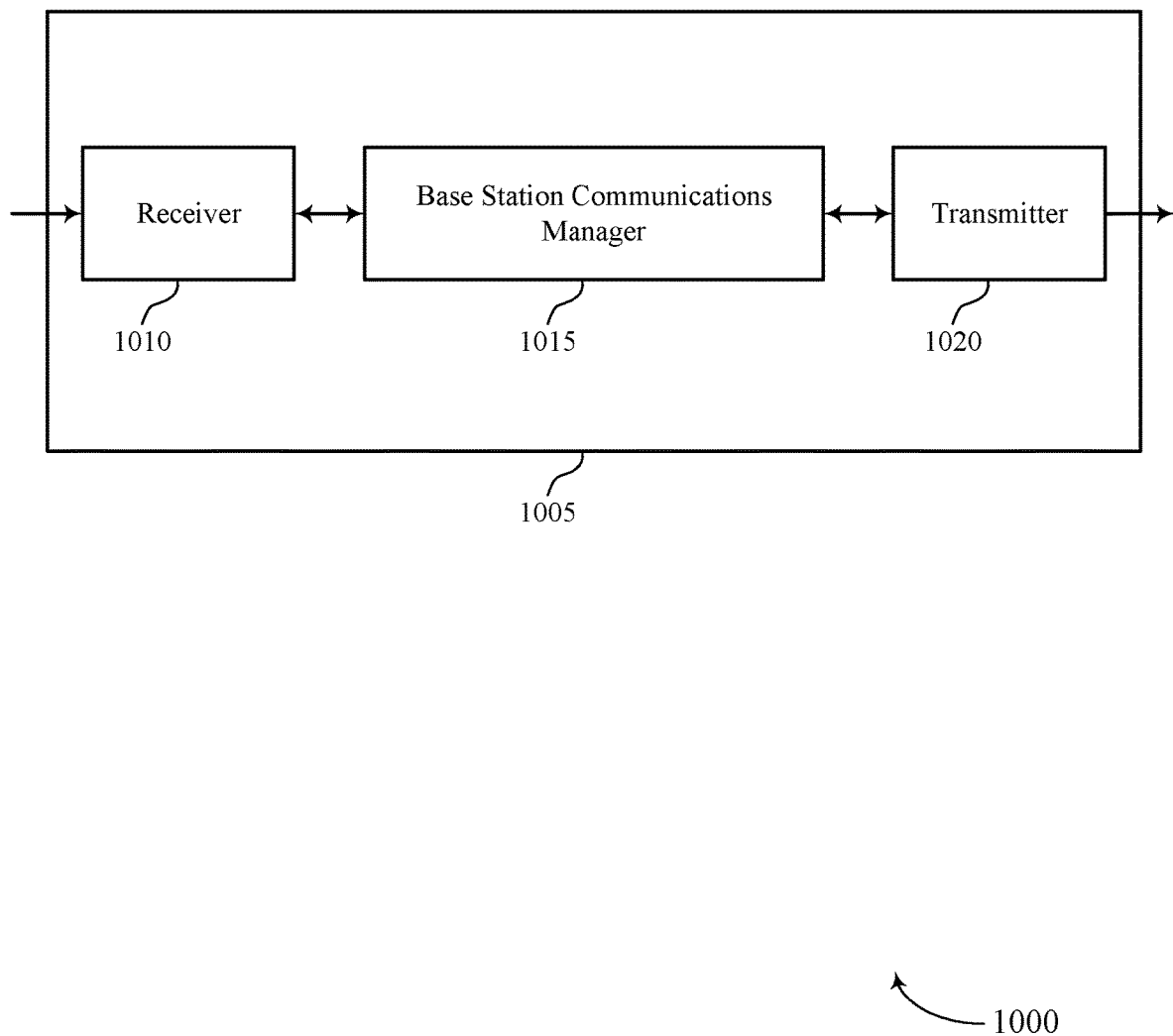
FIGS. 10 and 11 show block diagrams of devices that support scalable preamble design for random access in accordance with aspects of the present disclosure.

FIG. 10 shows a block diagram 1000 of a device 1005 that supports scalable preamble design for random access in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to scalable preamble design for random access, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may receive (e.g., via the receiver 1010), as part of a contention-based or uncoordinated random access procedure, such as a two-step RACH procedure, an uplink message from a UE, the uplink message including at least a preamble portion and a data portion, identify a set of sequences in the preamble portion, generate a block of coded symbols from the identified set of sequences, each coded symbol of the block of coded symbols corresponding to a sequence of the set of sequences, the block of coded symbols including a codeword, decode the codeword to generate a block of source symbols, and determine an identifier of the UE from the generated block of source symbols. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
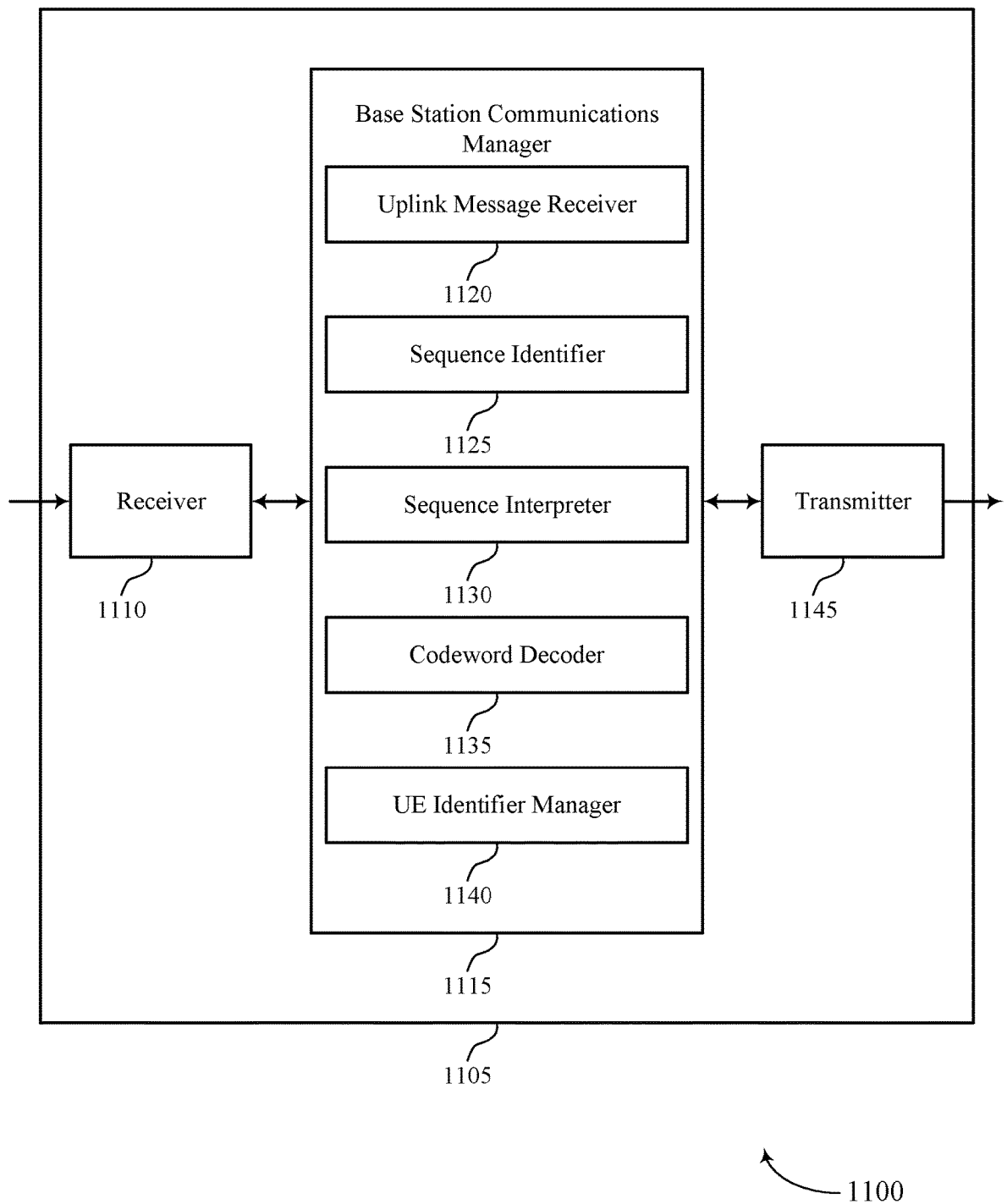

FIG. 11 shows a block diagram 1100 of a device 1105 that supports scalable preamble design for random access in accordance with aspects of the present disclosure. The device 1105 may be an example of aspects of a device 1005, or a base station 105 as described herein. The device 1105 may include a receiver 1110, a base station communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to scalable preamble design for random access, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the communications manager 1015 as described herein. The base station communications manager 1115 may include an uplink message receiver 1120, a sequence identifier 1125, a sequence interpreter 1130, a codeword decoder 1135, and a UE identifier manager 1140. The base station communications manager 1115 may be an example of aspects of the base station communications manager 1310 described herein.

The uplink message receiver 1120 may receive, as part of contention-base or uncoordinated random access procedure, such as a two-step RACH procedure, an uplink message from a UE, the uplink message including at least a preamble portion and a data portion. In some examples, the data portion may be received on a PUSCH. In some examples, the receiver 1110 may include the uplink message receiver, or otherwise support operations of the uplink message receiver 1120.

The sequence identifier 1125 may identify a set of sequences in the preamble portion.

The sequence interpreter 1130 may generate a block of coded symbols from the identified set of sequences, each coded symbol of the block of coded symbols corresponding to a sequence of the set of sequences, the block of coded symbols including a codeword.

The codeword decoder 1135 may decode the codeword to generate a block of source symbols.

The UE identifier manager 1140 may determine an identifier of the UE from the generated block of source symbols.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
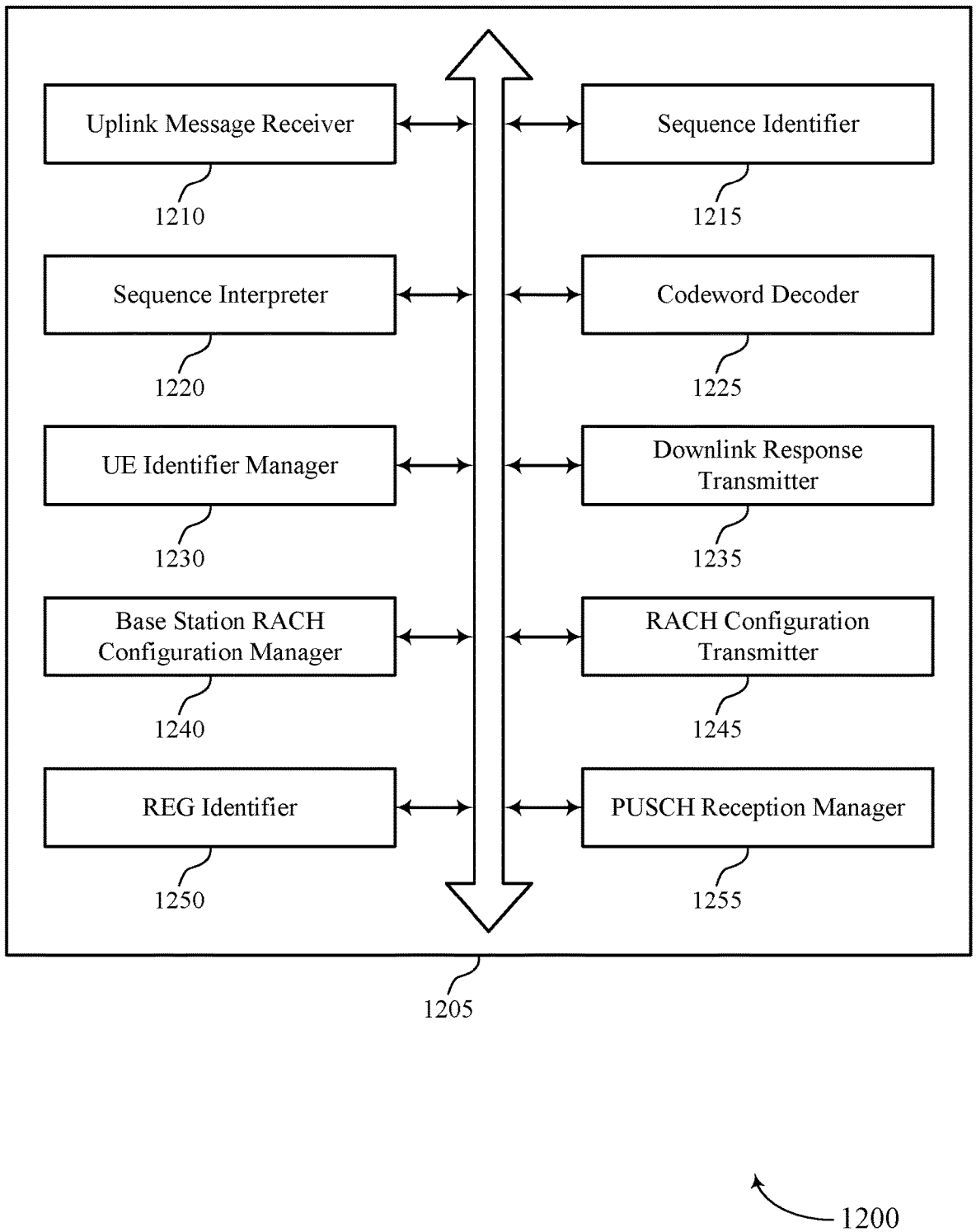
FIG. 12 shows a block diagram of a base station communications manager that supports scalable preamble design for random access in accordance with aspects of the present disclosure.

FIG. 12 shows a block diagram 1200 of a base station communications manager 1205 that supports scalable preamble design for random access in accordance with aspects of the present disclosure. The base station communications manager 1205 may be an example of aspects of a base station communications manager 1015, a base station communications manager 1115, or a base station communications manager 1310 described herein. The base station communications manager 1205 may include an uplink message receiver 1210, a sequence identifier 1215, a sequence interpreter 1220, a codeword decoder 1225, a UE identifier manager 1230, a downlink response transmitter 1235, a base station RACH configuration manager 1240, a RACH configuration transmitter 1245, a REG identifier 1250, and a PUSCH reception manager 1255. Each of these modules may communicate, directly or indirectly, with one another (e.g., via one or more buses).

The uplink message receiver 1210 may receive, as part of a contention-based or uncoordinated random access procedure, such as a two-step RACH procedure, an uplink message from a UE, the uplink message including at least a preamble portion and a data portion. In some examples, the data portion may be received on a PUSCH.

The sequence identifier 1215 may identify a set of sequences in the preamble portion. In some examples, the sequence identifier 1215 may identify the set of sequences from the set of resource element groups. In some examples, the sequence identifier 1215 may identify, for each resource element group, one of the set of sequences. In some examples, the sequence identifier 1215 may identify a sequence received in a resource element group of the set of resource element groups.

The sequence interpreter 1220 may generate a block of coded symbols from the identified set of sequences, each coded symbol of the block of coded symbols corresponding to a sequence of the set of sequences, the block of coded symbols including a codeword. In some examples, the sequence interpreter 1220 may map the sequence in the resource element group to a coded symbol of the block of coded symbols according to the identified index.

The codeword decoder 1225 may decode the codeword to generate a block of source symbols. In some cases, the block of source symbols include symbols of a non-binary alphabet. In some cases, a block size of the codeword is greater than a block size of the block of source symbols.

The UE identifier manager 1230 may determine an identifier of the UE from the generated block of source symbols.

The downlink response transmitter 1235 may transmit (e.g., via a transmitter), in response to the uplink message and according to the determined identifier of the UE, a downlink response as part of the two-step RACH procedure.

The base station RACH configuration manager 1240 may identify at least one parameter value to be used to generate a preamble of the uplink message.

The RACH configuration transmitter 1245 may transmit a configuration providing the at least one parameter value, where the received uplink message is based on the transmitted configuration.

The REG identifier 1250 may identify a resource element group configuration for the preamble portion, the resource element group configuration indicating a time and frequency position for each resource element group of the set of resource element groups.

In some examples, the REG identifier 1250 may identify an index associated with the resource element group. In some cases, the set of resource element groups span six physical resource blocks in a frequency domain and four OFDM symbol periods in a time domain. In some cases, the set of resource element groups span six physical resource blocks in a frequency domain and five OFDM symbol periods in a time domain.

Figure 13:
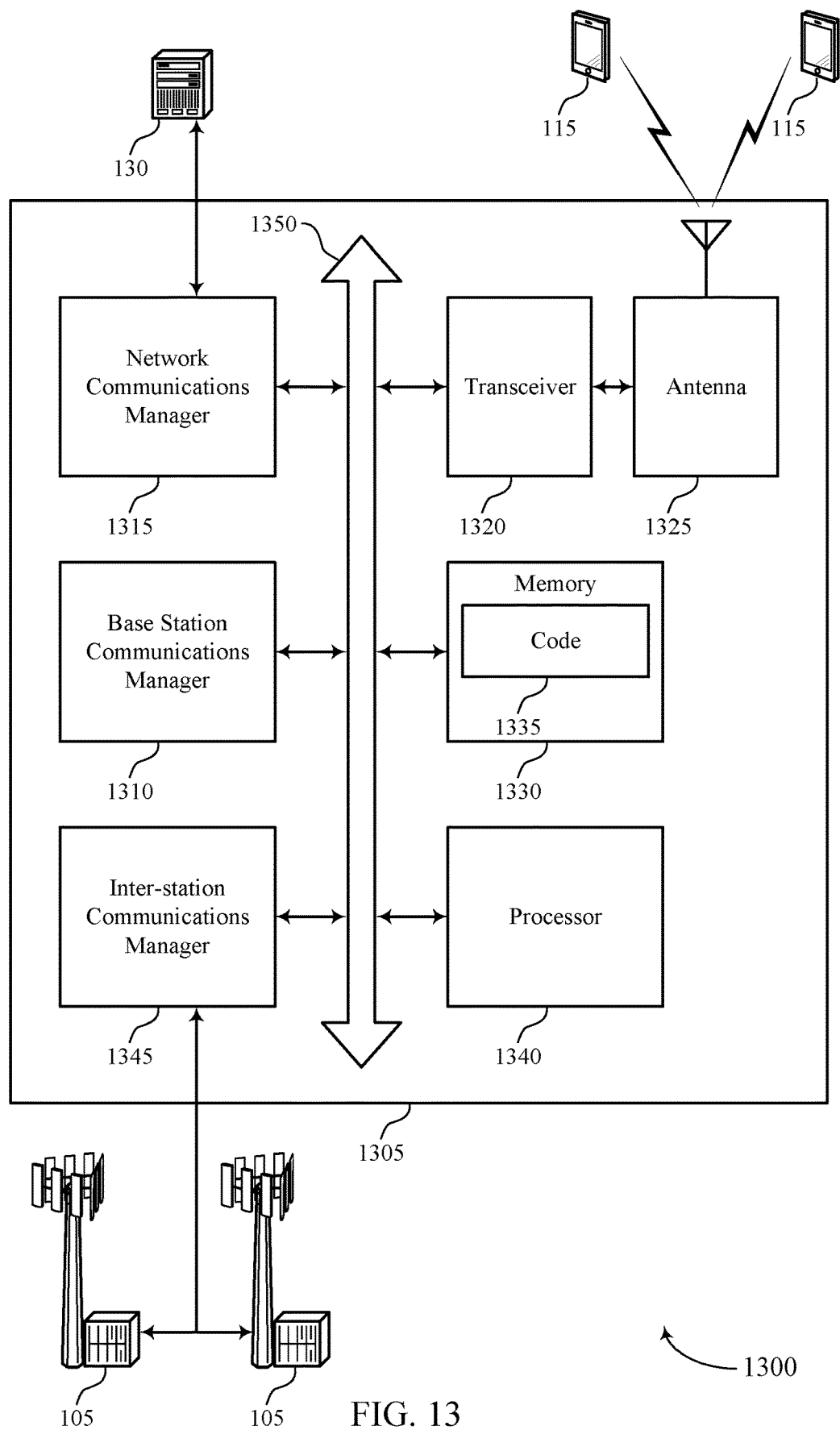
FIG. 13 shows a diagram of a system including a device that supports scalable preamble design for random access in accordance with aspects of the present disclosure.

The PUSCH reception manager 1255 may decode the data portion based on the identifier of the UE. In some cases, the uplink message may include a PUSCH waveform. In some cases, a numerology of the preamble portion is different from a numerology of the data portion. In some examples, the PUSCH reception manager 1255 may determine a channel estimation based at least in part on the preamble portion, decode the data portion based at least in part on the identifier of the UE and the determined channel estimation FIG. 13 shows a diagram of a system 1300 including a device 1305 that supports scalable preamble design for random access in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may receive (e.g., via the transceiver 1320), as part of a contention-based random access procedure, such as a two-step RACH procedure, an uplink message from a UE, the uplink message including at least a preamble portion and a data portion, identify a set of sequences in the preamble portion, generate a block of coded symbols from the identified set of sequences, each coded symbol of the block of coded symbols corresponding to a sequence of the set of sequences, the block of coded symbols including a codeword, decode the codeword to generate a block of source symbols, and determine an identifier of the UE from the generated block of source symbols.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting scalable preamble design for random access).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
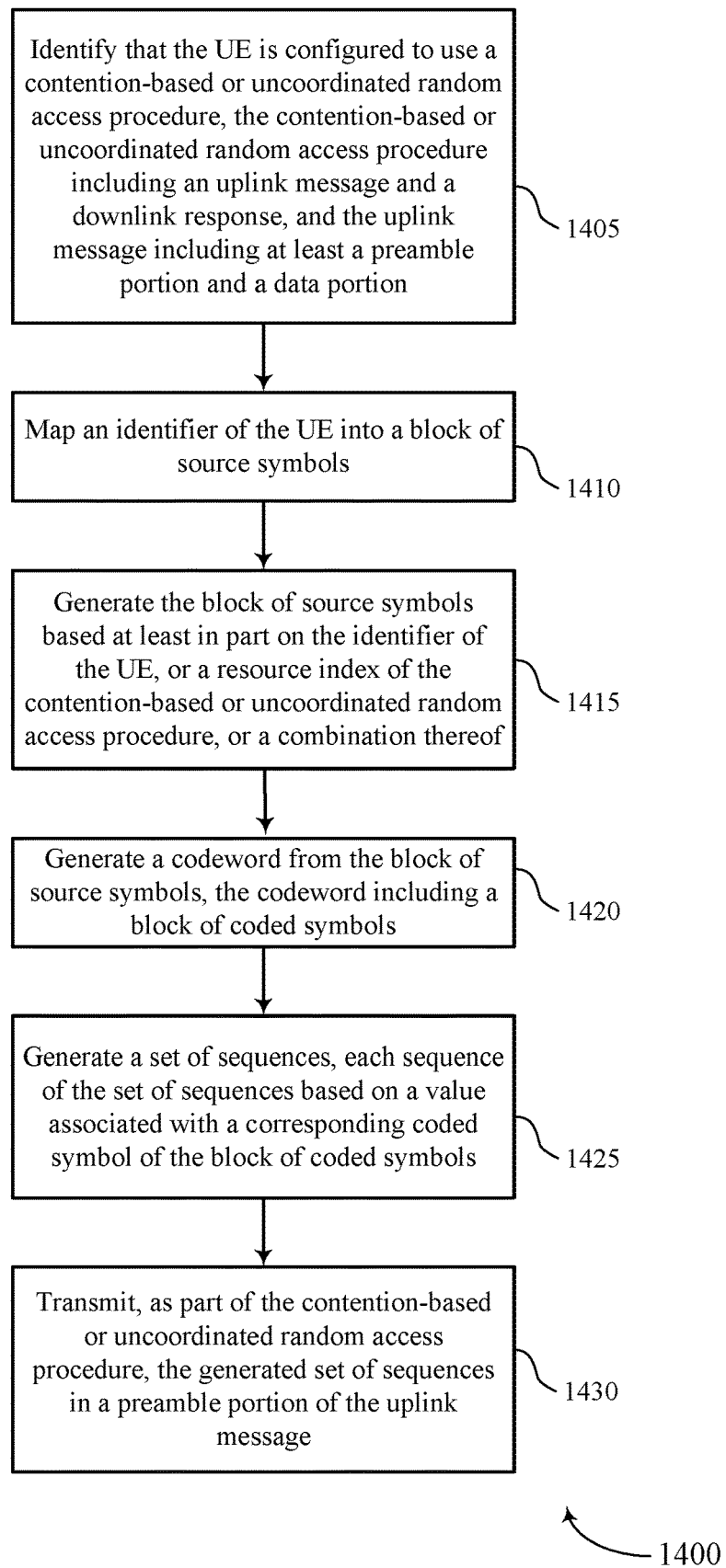
FIGS. 14 through 19 show flowcharts illustrating methods that support scalable preamble design for random access in accordance with aspects of the present disclosure.

FIG. 14 shows a flowchart illustrating a method 1400 that supports scalable preamble design for random access in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may identify that the UE is configured to use a contention-based or uncoordinated random access procedure (e.g., a two-step RACH procedure), the contention-based or uncoordinated random access procedure including an uplink message and a downlink response, and the uplink message including at least a preamble portion and a data portion. The operations of 1405 may be performed according to the methods described herein. In some examples, aspects of the operations of 1405 may be performed by a UE RACH configuration manager as described with reference to FIGS. 6 through 9.

At 1410, the UE may map an identifier of the UE into a block of source symbols. The operations of 1410 may be performed according to the methods described herein. In some examples, aspects of the operations of 1410 may be performed by a source symbol mapper as described with reference to FIGS. 6 through 9.

At 1415, the UE may generate the block of source symbols based at least in part on the identifier of the UE, or a resource index of the contention-based or uncoordinated random access procedure, or a combination thereof. The operations of 1415 may be performed according to the methods described herein. In some examples, aspects of the operations of 1415 may be performed by a source symbol mapper as described with reference to FIGS. 6 through 9.

At 1420, the UE may generate a codeword from the block of source symbols, the codeword including a block of coded symbols. The operations of 1420 may be performed according to the methods described herein. In some examples, aspects of the operations of 1420 may be performed by a codeword generator as described with reference to FIGS. 6 through 9.

At 1425, the UE may generate a set of sequences, each sequence of the set of sequences based on a value associated with a corresponding coded symbol of the block of coded symbols. The operations of 1425 may be performed according to the methods described herein. In some examples, aspects of the operations of 1425 may be performed by a sequence generator as described with reference to FIGS. 6 through 9.

At 1430, the UE may transmit, as part of the contention-based or uncoordinated random access procedure, the generated set of sequences in a preamble portion of the uplink message. The operations of 1430 may be performed according to the methods described herein. In some examples, aspects of the operations of 1430 may be performed by an uplink message transmitter as described with reference to FIGS. 6 through 9.

Figure 15:
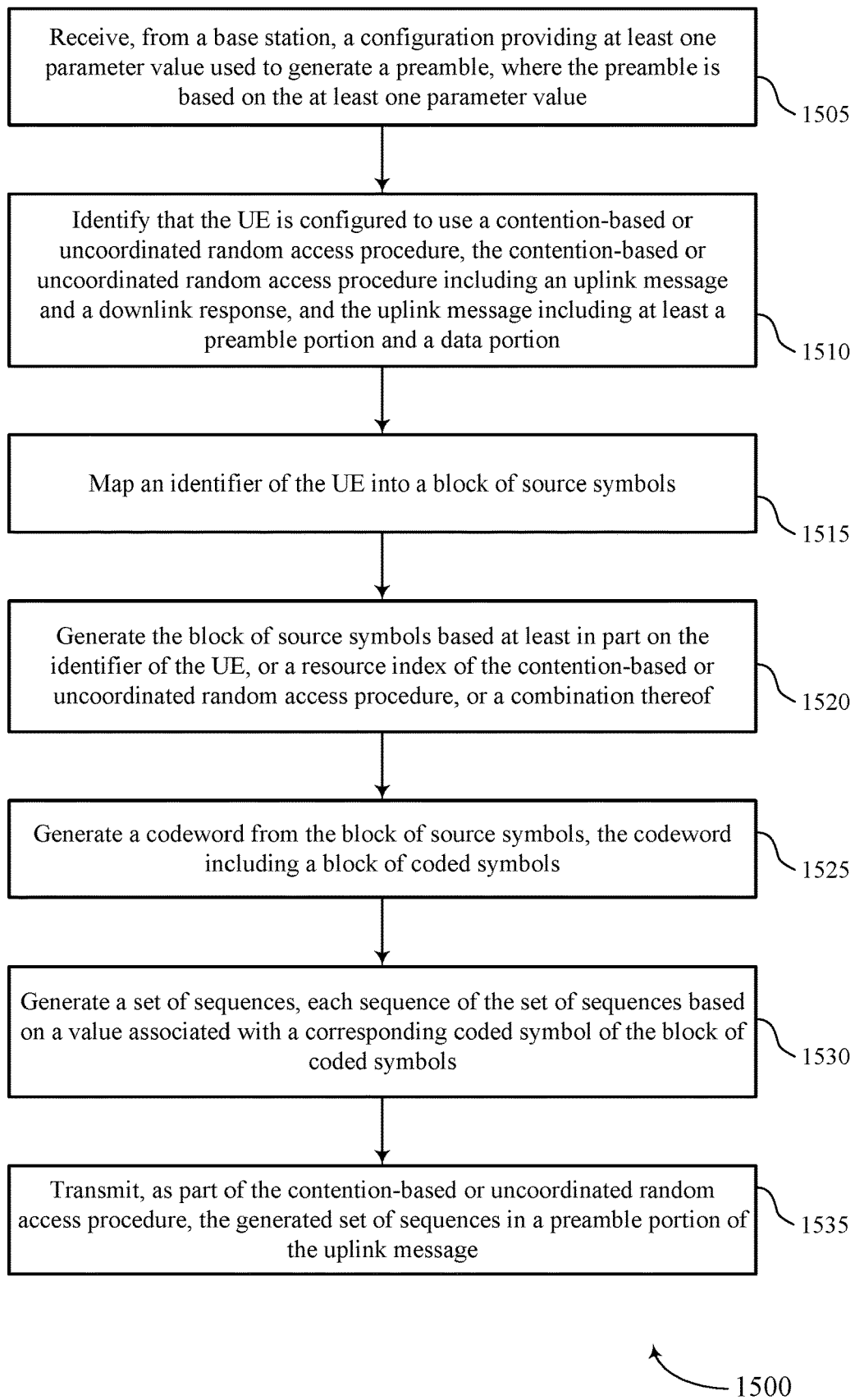

FIG. 15 shows a flowchart illustrating a method 1500 that supports scalable preamble design for random access in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may receive, from a base station, a configuration providing at least one parameter value used to generate a preamble, where the preamble is based on the at least one parameter value. The operations of 1505 may be performed according to the methods described herein. In some examples, aspects of the operations of 1505 may be performed by a RACH configuration receiver as described with reference to FIGS. 6 through 9.

At 1510, the UE may identify that the UE is configured to use a contention-based or uncoordinated random access procedure (e.g., a two-step RACH procedure), the contention-based or uncoordinated random access procedure including an uplink message and a downlink response, and the uplink message including at least a preamble portion and a data portion. The operations of 1510 may be performed according to the methods described herein. In some examples, aspects of the operations of 1510 may be performed by a UE RACH configuration manager as described with reference to FIGS. 6 through 9.

At 1515, the UE may map an identifier of the UE into a block of source symbols. The operations of 1515 may be performed according to the methods described herein. In some examples, aspects of the operations of 1515 may be performed by a source symbol mapper as described with reference to FIGS. 6 through 9.

At 1520, the UE may generate the block of source symbols based at least in part on the identifier of the UE, or a resource index of the contention-based or uncoordinated random access procedure, or a combination thereof. The operations of 1520 may be performed according to the methods described herein. In some examples, aspects of the operations of 1520 may be performed by a source symbol mapper as described with reference to FIGS. 6 through 9.

At 1525, the UE may generate a codeword from the block of source symbols, the codeword including a block of coded symbols. The operations of 1525 may be performed according to the methods described herein. In some examples, aspects of the operations of 1525 may be performed by a codeword generator as described with reference to FIGS. 6 through 9.

At 1530, the UE may generate a set of sequences, each sequence of the set of sequences based on a value associated with a corresponding coded symbol of the block of coded symbols. The operations of 1530 may be performed according to the methods described herein. In some examples, aspects of the operations of 1530 may be performed by a sequence generator as described with reference to FIGS. 6 through 9.

At 1535, the UE may transmit, as part of the contention-based or uncoordinated random access procedure, the generated set of sequences in a preamble portion of the uplink message. The operations of 1535 may be performed according to the methods described herein. In some examples, aspects of the operations of 1535 may be performed by an uplink message transmitter as described with reference to FIGS. 6 through 9.

Figure 16:
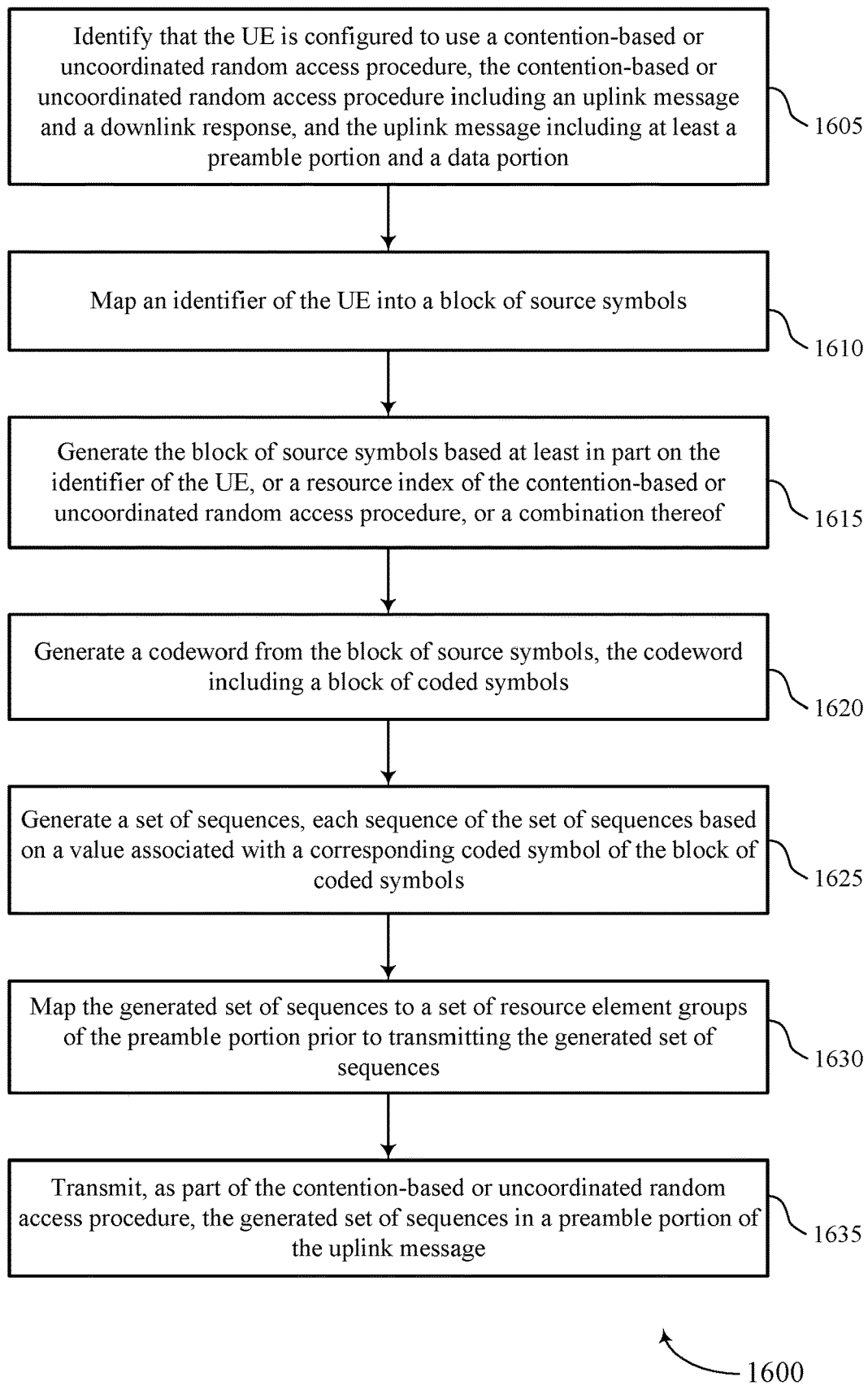

FIG. 16 shows a flowchart illustrating a method 1600 that supports scalable preamble design for random access in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1605, the UE may identify that the UE is configured to use a contention-based or uncoordinated random access procedure (e.g., a two-step RACH procedure), the contention-based or uncoordinated random access procedure including an uplink message and a downlink response, and the uplink message including at least a preamble portion and a data portion. The operations of 1605 may be performed according to the methods described herein. In some examples, aspects of the operations of 1605 may be performed by a UE RACH configuration manager as described with reference to FIGS. 6 through 9.

At 1610, the UE may map an identifier of the UE into a block of source symbols. The operations of 1610 may be performed according to the methods described herein. In some examples, aspects of the operations of 1610 may be performed by a source symbol mapper as described with reference to FIGS. 6 through 9.

At 1615, the UE may generate the block of source symbols based at least in part on the identifier of the UE, or a resource index of the contention-based or uncoordinated random access procedure, or a combination thereof. The operations of 1615 may be performed according to the methods described herein. In some examples, aspects of the operations of 1615 may be performed by a source symbol mapper as described with reference to FIGS. 6 through 9.

At 1620, the UE may generate a codeword from the block of source symbols, the codeword including a block of coded symbols. The operations of 1620 may be performed according to the methods described herein. In some examples, aspects of the operations of 1620 may be performed by a codeword generator as described with reference to FIGS. 6 through 9.

At 1625, the UE may generate a set of sequences, each sequence of the set of sequences based on a value associated with a corresponding coded symbol of the block of coded symbols. The operations of 1625 may be performed according to the methods described herein. In some examples, aspects of the operations of 1625 may be performed by a sequence generator as described with reference to FIGS. 6 through 9.

At 1630, the UE may map the generated set of sequences to a set of resource element groups of the preamble portion prior to transmitting the generated set of sequences. The operations of 1630 may be performed according to the methods described herein. In some examples, aspects of the operations of 1630 may be performed by a REG mapper as described with reference to FIGS. 6 through 9.

At 1635, the UE may transmit, as part of the contention-based or uncoordinated random access procedure, the generated set of sequences in a preamble portion of the uplink message. The operations of 1635 may be performed according to the methods described herein. In some examples, aspects of the operations of 1635 may be performed by an uplink message transmitter as described with reference to FIGS. 6 through 9.

Figure 17:
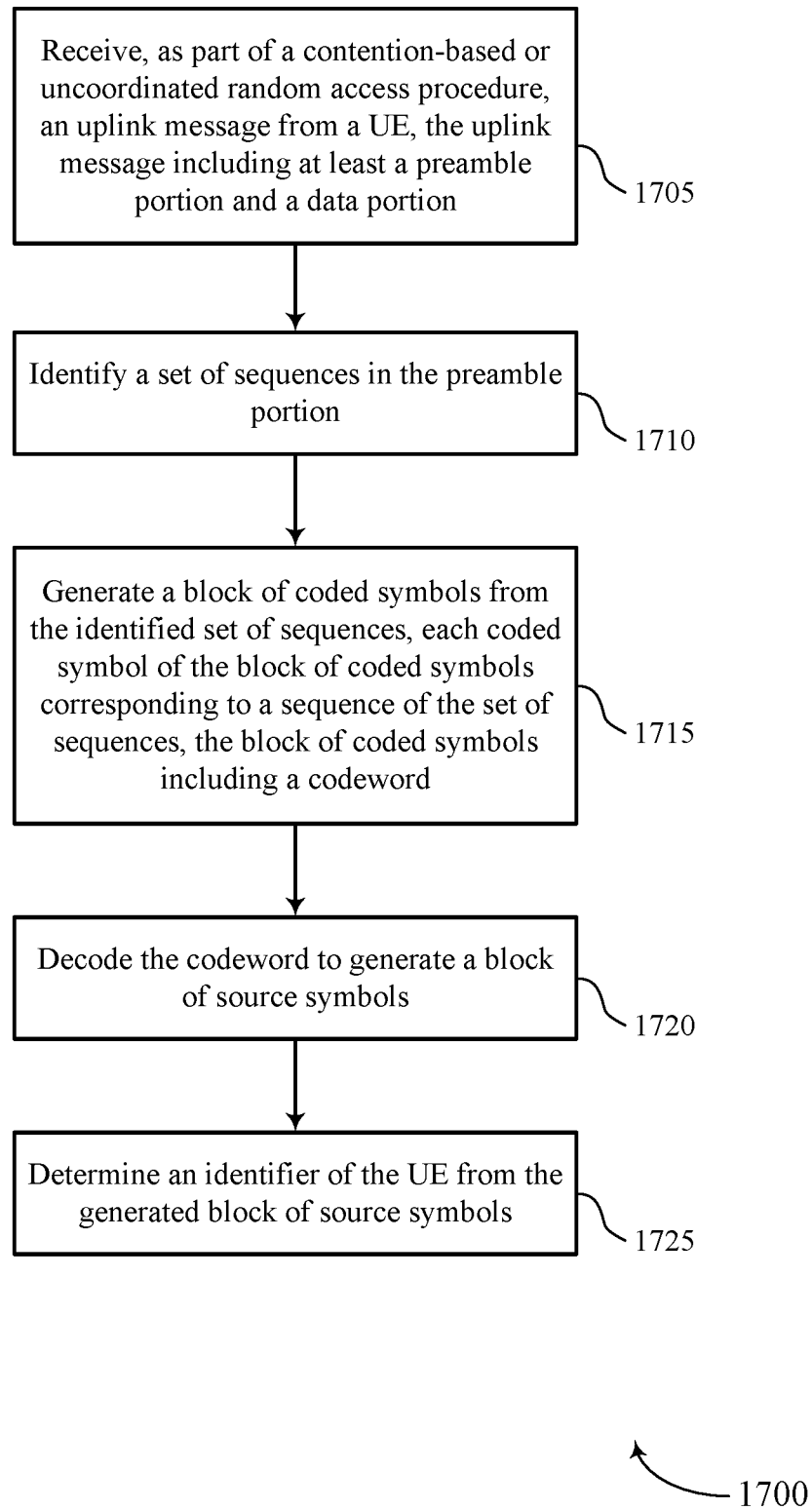

FIG. 17 shows a flowchart illustrating a method 1700 that supports scalable preamble design for random access in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1705, the base station may receive, as part of a contention-based or uncoordinated random access procedure (e.g., a two-step RACH procedure), an uplink message from a UE, the uplink message including at least a preamble portion and a data portion. The operations of 1705 may be performed according to the methods described herein. In some examples, aspects of the operations of 1705 may be performed by an uplink message receiver as described with reference to FIGS. 10 through 13.

At 1710, the base station may identify a set of sequences in the preamble portion. The operations of 1710 may be performed according to the methods described herein. In some examples, aspects of the operations of 1710 may be performed by a sequence identifier as described with reference to FIGS. 10 through 13.

At 1715, the base station may generate a block of coded symbols from the identified set of sequences, each coded symbol of the block of coded symbols corresponding to a sequence of the set of sequences, the block of coded symbols including a codeword. The operations of 1715 may be performed according to the methods described herein. In some examples, aspects of the operations of 1715 may be performed by a sequence interpreter as described with reference to FIGS. 10 through 13.

At 1720, the base station may decode the codeword to generate a block of source symbols. The operations of 1720 may be performed according to the methods described herein. In some examples, aspects of the operations of 1720 may be performed by a codeword decoder as described with reference to FIGS. 10 through 13.

At 1725, the base station may determine an identifier of the UE from the generated block of source symbols. The operations of 1725 may be performed according to the methods described herein. In some examples, aspects of the operations of 1725 may be performed by a UE identifier manager as described with reference to FIGS. 10 through 13.

Figure 18:
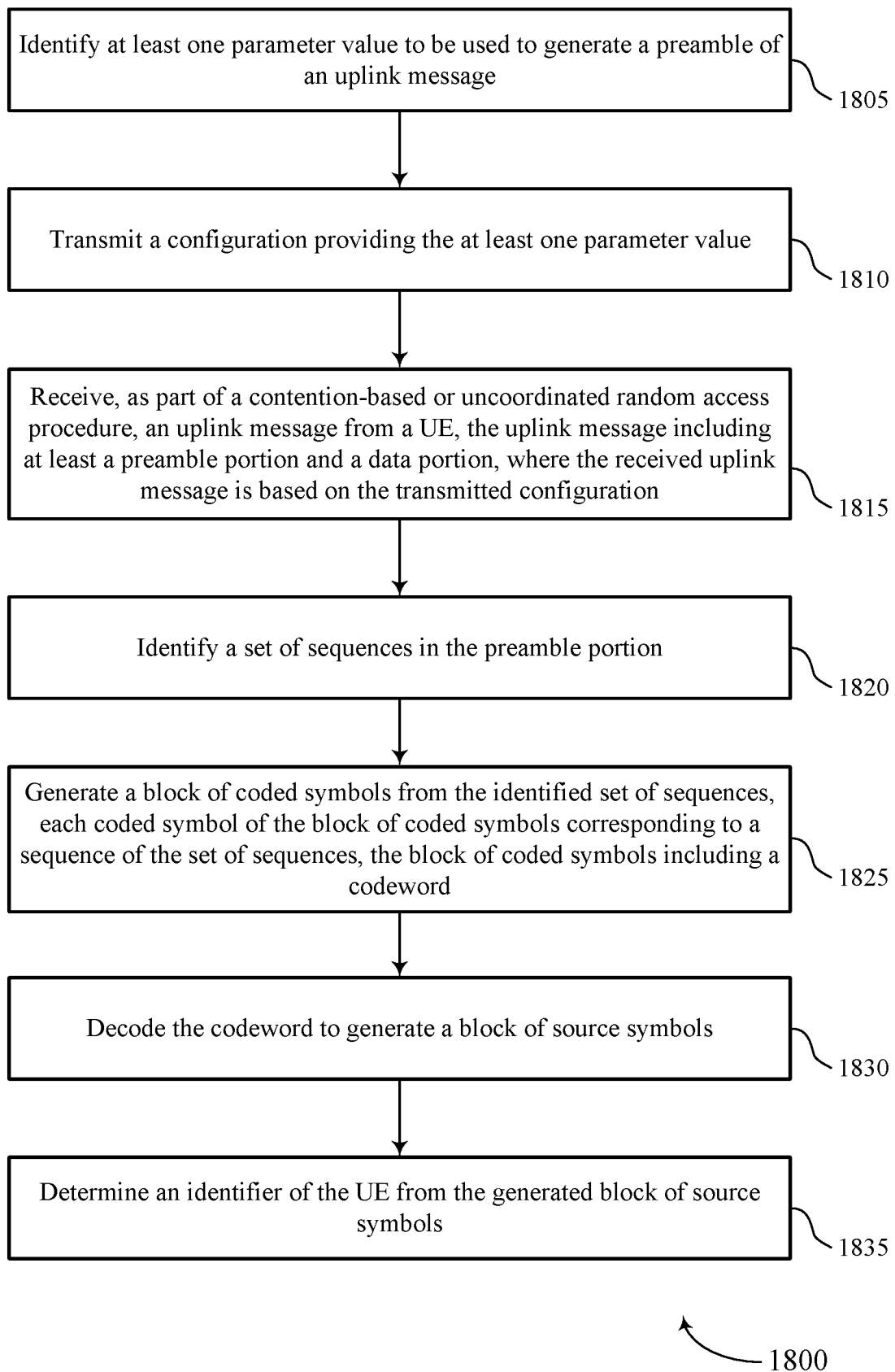

FIG. 18 shows a flowchart illustrating a method 1800 that supports scalable preamble design for random access in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1805, the base station may identify at least one parameter value to be used to generate a preamble of an uplink message. The operations of 1805 may be performed according to the methods described herein. In some examples, aspects of the operations of 1805 may be performed by a base station RACH configuration manager as described with reference to FIGS. 10 through 13.

At 1810, the base station may transmit a configuration providing the at least one parameter value. The operations of 1810 may be performed according to the methods described herein. In some examples, aspects of the operations of 1810 may be performed by a RACH configuration transmitter as described with reference to FIGS. 10 through 13.

At 1815, the base station may receive, as part of a contention-based or uncoordinated random access procedure (e.g., a two-step RACH procedure), an uplink message from a UE, the uplink message including at least a preamble portion and a data portion, where the received uplink message is based on the transmitted configuration. The operations of 1815 may be performed according to the methods described herein. In some examples, aspects of the operations of 1815 may be performed by an uplink message receiver as described with reference to FIGS. 10 through 13.

At 1820, the base station may identify a set of sequences in the preamble portion. The operations of 1820 may be performed according to the methods described herein. In some examples, aspects of the operations of 1820 may be performed by a sequence identifier as described with reference to FIGS. 10 through 13.

At 1825, the base station may generate a block of coded symbols from the identified set of sequences, each coded symbol of the block of coded symbols corresponding to a sequence of the set of sequences, the block of coded symbols including a codeword. The operations of 1825 may be performed according to the methods described herein. In some examples, aspects of the operations of 1825 may be performed by a sequence interpreter as described with reference to FIGS. 10 through 13.

At 1830, the base station may decode the codeword to generate a block of source symbols. The operations of 1830 may be performed according to the methods described herein. In some examples, aspects of the operations of 1830 may be performed by a codeword decoder as described with reference to FIGS. 10 through 13.

At 1835, the base station may determine an identifier of the UE from the generated block of source symbols. The operations of 1835 may be performed according to the methods described herein. In some examples, aspects of the operations of 1835 may be performed by a UE identifier manager as described with reference to FIGS. 10 through 13.

Figure 19:
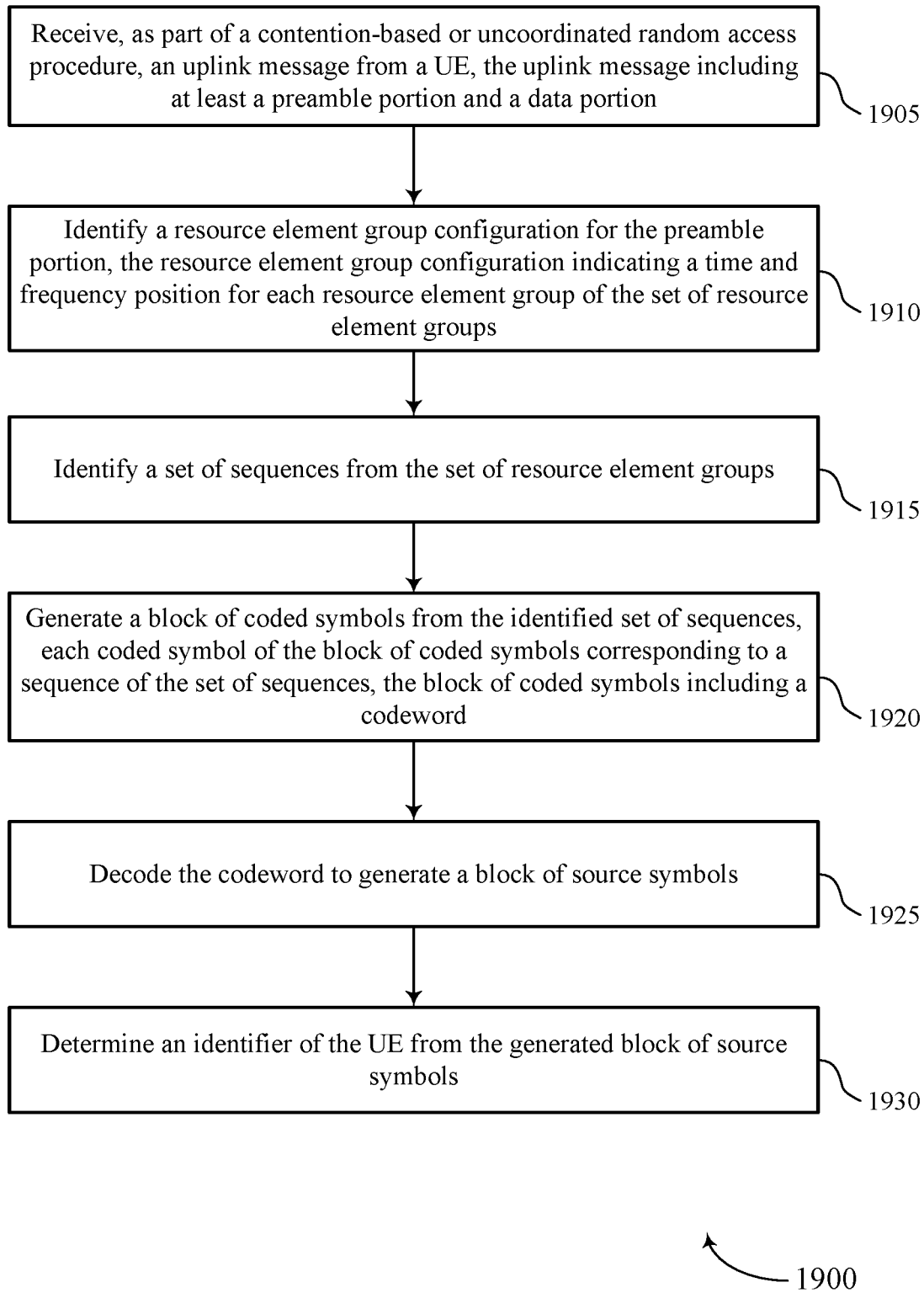

FIG. 19 shows a flowchart illustrating a method 1900 that supports scalable preamble design for random access in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1905, the base station may receive, as part of a contention-based or uncoordinated random access procedure (e.g., a two-step RACH procedure), an uplink message from a UE, the uplink message including at least a preamble portion and a data portion. The operations of 1905 may be performed according to the methods described herein. In some examples, aspects of the operations of 1905 may be performed by an uplink message receiver as described with reference to FIGS. 10 through 13.

At 1910, the base station may identify a resource element group configuration for the preamble portion, the resource element group configuration indicating a time and frequency position for each resource element group of the set of resource element groups. The operations of 1910 may be performed according to the methods described herein. In some examples, aspects of the operations of 1910 may be performed by a REG identifier as described with reference to FIGS. 10 through 13.

At 1915, the base station may identify a set of sequences from the set of resource element groups. The operations of 1915 may be performed according to the methods described herein. In some examples, aspects of the operations of 1915 may be performed by a sequence identifier as described with reference to FIGS. 10 through 13.

At 1920, the base station may generate a block of coded symbols from the identified set of sequences, each coded symbol of the block of coded symbols corresponding to a sequence of the set of sequences, the block of coded symbols including a codeword. The operations of 1920 may be performed according to the methods described herein. In some examples, aspects of the operations of 1920 may be performed by a sequence interpreter as described with reference to FIGS. 10 through 13.

At 1925, the base station may decode the codeword to generate a block of source symbols. The operations of 1925 may be performed according to the methods described herein. In some examples, aspects of the operations of 1925 may be performed by a codeword decoder as described with reference to FIGS. 10 through 13.

At 1930, the base station may determine an identifier of the UE from the generated block of source symbols. The operations of 1930 may be performed according to the methods described herein. In some examples, aspects of the operations of 1930 may be performed by a UE identifier manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying that the UE is configured to use a contention-based or uncoordinated random access procedure, the contention-based or uncoordinated random access procedure including an initial uplink message and a downlink response, and the initial uplink message including at least a preamble portion and a data portion;
   mapping an identifier of the UE into a block of source symbols;

generating the block of source symbols based at least in part on the identifier of the UE, or a resource index of the contention-based or uncoordinated random access procedure, or a combination thereof;

generating a codeword from the block of source symbols, the codeword comprising a block of coded symbols;

generating a set of sequences, each sequence of the set of sequences based at least in part on a value associated with a respective corresponding coded symbol of the block of coded symbols; and transmitting, as part of the contention-based or uncoordinated random access procedure, the generated set of sequences in the preamble portion of the initial uplink message.

2. The method of claim 1, further comprising:
receiving, from a base station, a configuration providing at least one parameter value used to generate a preamble, wherein the preamble is based at least in part on the at least one parameter value.

3. The method of claim 1, further comprising:
mapping the generated set of sequences to a plurality of resource element groups of the preamble portion prior to transmitting the generated set of sequences.

4. The method of claim 3, wherein mapping the generated set of sequences to the plurality of resource element groups comprises:
mapping, for each sequence of the generated set of sequences, the sequence to one of the plurality of resource element groups.

5. The method of claim 3, wherein mapping the generated set of sequences to the plurality of resource element groups comprises:
identifying an index associated with a sequence of the generated set of sequences; and
mapping the sequence to one of the plurality of resource element groups based at least in part on the identified index.

6. The method of claim 5, wherein:
mapping the sequence to the one of the plurality of resource element groups is further based at least in part on an identifier of a cell of a base station and an index of the resource element group.

7. The method of claim 3, wherein the plurality of resource element groups span six physical resource blocks in a frequency domain and four OFDM symbol periods in a time domain.

8. The method of claim 3, wherein the plurality of resource element groups span six physical resource blocks in a frequency domain and five OFDM symbol periods in a time domain.

9. The method of claim 1, wherein generating the set of sequences comprises, for each sequence of the set of sequences:
identifying an index indicated by a coded symbol of the block of coded symbols;
identifying at least one parameter value associated with the identified index, wherein the at least one parameter value comprises one or more of a comb index, or a root value, or a cyclic shift; and
generating the sequence based at least in part on the at least one parameter value, wherein the sequence comprises a finite-size orthogonal sequence.

10. The method of claim 1, wherein the block of source symbols comprise symbols of a non-binary alphabet.

11. The method of claim 1, wherein a block size of the generated codeword is greater than a block size of the block of source symbols.

12. The method of claim 1, wherein:
each source symbol of the block of source symbols is selected from a set of symbols; and
a set size of the set of symbols, or a block size of the block of source symbols, or both, are based at least in part on a target collision probability.

13. The method of claim 1, further comprising:
generating the data portion based at least in part on the identifier of the UE.

14. The method of claim 1, wherein a numerology of the preamble portion is different from a numerology of the data portion.

15. The method of claim 1, further comprising:
transmitting the data portion of the initial uplink message on a physical uplink shared channel (PUSCH).

16. A method for wireless communication at a base station, comprising:
receiving, as part of a contention-based or uncoordinated random access procedure, an uplink message from a user equipment (UE), the uplink message including at least a preamble portion and a data portion;
identifying a set of sequences in the preamble portion;
generating a block of coded symbols from the identified set of sequences, each coded symbol of the block of coded symbols corresponding to a sequence of the set of sequences, the block of coded symbols comprising a codeword;
decoding the codeword to generate a block of source symbols; and
determining an identifier of the UE from the generated block of source symbols.

17. The method of claim 16, further comprising:
determining a channel estimation based at least in part on the preamble portion; and
decoding the data portion based at least in part on the identifier of the UE and the determined channel estimation.

18. The method of claim 16, further comprising:
transmitting, in response to the uplink message and according to the determined identifier of the UE, a downlink response as part of the contention-based or uncoordinated random access procedure.

19. The method of claim 16, further comprising:
identifying at least one parameter value to be used to generate a preamble of the uplink message; and
transmitting a configuration providing the at least one parameter value, wherein the received uplink message is based at least in part on the transmitted configuration.

20. The method of claim 16, wherein identifying the set of sequences in the preamble portion comprises:
identifying a resource element group configuration for the preamble portion, the resource element group configuration indicating a time and frequency position for each resource element group of a plurality of resource element groups; and
identifying the set of sequences from the plurality of resource element groups.

21. The method of claim 20, wherein identifying the set of sequences from the plurality of resource element groups comprises:
identifying, for each resource element group, one of the set of sequences.

22. The method of claim 20, further comprising:
identifying a sequence of the set of sequences received in a resource element group of the plurality of resource element groups;

identifying an index associated with the resource element group; and mapping the sequence in the resource element group to a coded symbol of the block of coded symbols according to the identified index.

23. The method of claim 20, wherein the plurality of resource element groups span six physical resource blocks in a frequency domain and four OFDM symbol periods in a time domain.

24. The method of claim 20, wherein the plurality of resource element groups span six physical resource blocks in a frequency domain and five OFDM symbol periods in a time domain.

25. The method of claim 16, wherein the block of source symbols comprise symbols of a non-binary alphabet.

26. The method of claim 16, wherein a block size of the codeword is greater than a block size of the block of source symbols.

27. The method of claim 16, further comprising:

decoding the data portion based at least in part on the identifier of the UE.

28. The method of claim 16, wherein a numerology of the preamble portion is different from a numerology of the data portion.

29. An apparatus for wireless communication at a user equipment (UE), comprising:

a processor;

memory coupled to the processor;

instructions stored in the memory and executable by the processor to cause the apparatus to:

identify that the UE is configured to use a contention-based or uncoordinated random access procedure, the contention-based or uncoordinated random access procedure including an initial uplink message and a downlink response, and the initial uplink message including at least a preamble portion and a data portion;

map an identifier of the UE into a block of source symbols;

generate a codeword from the block of source symbols, the codeword comprising a block of coded symbols; and generate a set of sequences, each sequence of the set of sequences based at least in part on a value associated with a corresponding respective coded symbol of the block of coded symbols; and a transmitter configured to transmit, as part of the contention-based or uncoordinated random access procedure, the generated set of sequences in the preamble portion of the initial uplink message.

30. An apparatus for wireless communication at a base station, comprising:

a receiver configured to receive, as part of a contention-based or uncoordinated random access procedure, an uplink message from a user equipment (UE), the uplink message including at least a preamble portion and a data portion;

a processor;

memory coupled to the processor; and instructions stored in the memory and executable by the processor to cause the apparatus to:

identify a set of sequences in the preamble portion;

generate a block of coded symbols from the identified set of sequences, each coded symbol of the block of coded symbols corresponding to a sequence of the set of sequences, the block of coded symbols comprising a codeword;

decode the codeword to generate a block of source symbols; and determine an identifier of the UE from the generated block of source symbols.

* * * * *